(12) United States Patent
Rumynin et al.

(10) Patent No.: US 7,136,888 B2
(45) Date of Patent: Nov. 14, 2006

(54) PARALLEL COUNTER AND A LOGIC CIRCUIT FOR PERFORMING MULTIPLICATION

(75) Inventors: Dmitriy Rumynin, Coventry (GB); Sunil Talwar, Leamington Spa (GB); Peter Meulemans, Coventry (GB)

(73) Assignee: Arithmatica Limited, Leamington Spa ( * ) Notice: Subject to any disclaimer, the term of this patent is extended or adjusted under 35 U.S.C. 154(b) by 663 days.

(21) Appl. No.: 09/917,257

(22) Filed: Jul. 27, 2001

(65) Prior Publication Data

US 2002/0078110 A1 Jun. 20, 2002

Related U.S. Application Data

(63) Continuation-in-part of application No. 09/769,954, filed on Jan. 25, 2001.

(30) Foreign Application Priority Data

Aug. 4, 2000 (GB) .............................................. 0019287

(51) Int. Cl.
*G06F 7/52* (2006.01)

(52) U.S. Cl. ..................................................... 708/210
(58) Field of Classification Search ................ 708/210, 708/709, 626
See application file for complete search history.

(56) References Cited

U.S. PATENT DOCUMENTS

| 3,634,658 | A | 1/1972 | Brown ................... 235/92 LG |
| 3,757,098 | A | 9/1973 | Wright ........................ 235/175 |
| 4,399,517 | A | 8/1983 | Niehaus et al. ............. 364/784 |

(Continued)

FOREIGN PATENT DOCUMENTS

| EP | 0168650 | 1/1986 |
| EP | 0309292 | 3/1989 |
| EP | 0442356 | 8/1991 |
| EP | 0741354 | 11/1996 |
| FR | 2475250 | 8/1981 |
| GB | 2016181 | 9/1979 |
| GB | 2062310 | 5/1981 |
| GB | 2365636 | 2/2002 |
| GB | 2365637 | 2/2002 |
| WO | WO-99/22292 | 5/1999 |
| WO | WO-02/12995 | 2/2002 |

OTHER PUBLICATIONS

Nicholson, J. O., "Parallel–Carry Adders Listing Two–Bit Covers", *IBM Technical Disclosure Bulletin, 22(11)*, (Apr., 1980),5036–5037.

Ong, S., et al., "A Comparision of ALU Structures for VLSI Technology", *Proceedings, 6th Symposium on Computer Arithmetic (IEEE)*, (1983),10–16.

Schmookler, M. S., et al., "Group–Carry Generator", *IBM Technical Disclosure Bulletin, 6(1)*, (Jun., 1963),77–78.

Weinberger, A., "Extension of the Size of Group Carry Signals", *IBM Technical Disclosure Bulletin, 22(4)*, (Sep., 1979),1548–1550.

(Continued)

*Primary Examiner*—D. H. Malzahn
(74) *Attorney, Agent, or Firm*—Schwegman, Lundberg Woessner & Kluth P.A.

(57) ABSTRACT

A logic circuit such as a parallel counter comprises logic for generating output bits as elementary symmetric functions of the input bits. The parallel counter can be used in a multiplication circuit. A multiplication circuit is also provided in which an array of combinations of each bit of a binary number with each other bit of another binary number is generated having a reduced form in order to reduce the steps required in array reduction.

100 Claims, 31 Drawing Sheets

U.S. PATENT DOCUMENTS

| | | | |
|---|---|---|---|
| 4,607,176 A | 8/1986 | Burrows et al. | 307/449 |
| 5,095,457 A | 3/1992 | Jeong | 364/758 |
| 5,095,547 A | 3/1992 | Kerns | 2/160 |
| 5,175,862 A | 12/1992 | Phelps et al. | 395/800 |
| 5,187,679 A | 2/1993 | Vassiliadis et al. | 364/786 |
| 5,325,320 A | 6/1994 | Chiu | 364/760 |
| 5,343,417 A | 8/1994 | Flora | 364/758 |
| 5,497,342 A | 3/1996 | Mou et al. | 364/786 |
| 5,524,082 A | 6/1996 | Horstmann et al. | 364/489 |
| 5,701,504 A | 12/1997 | Timko | |
| 5,964,827 A | 10/1999 | Ngo et al. | 708/710 |
| 5,995,029 A | 11/1999 | Ryu | 341/101 |
| 6,008,668 A | 12/1999 | Saruwatari | |
| 6,023,566 A | 2/2000 | Belkhale et al. | 395/500.03 |
| 6,175,852 B1 | 1/2001 | Dhong et al. | 708/712 |
| 6,269,386 B1 | 7/2001 | Siers et al. | 708/710 |
| 6,344,760 B1 | 2/2002 | Pyo | |
| 6,445,210 B1 | 9/2002 | Nojiri | |
| 6,490,608 B1 | 12/2002 | Zhu | 708/626 |
| 6,577,164 B1 | 6/2003 | Tomita | |
| 6,724,223 B1 | 4/2004 | Ichiguchi et al. | |
| 6,882,175 B1 | 4/2005 | Motegi et al. | |
| 6,883,011 B1 | 4/2005 | Rumynin et al. | |
| 6,938,061 B1 | 8/2005 | Rumynin et al. | |
| 2003/0016055 A1 | 1/2003 | Oodaira et al. | |
| 2004/0103135 A1 | 5/2004 | Talwar | |
| 2004/0153490 A1 | 8/2004 | Talwar et al. | |
| 2005/0021585 A1 | 1/2005 | Rumynin et al. | |

OTHER PUBLICATIONS

Weinberger, A., "Improved Carry–Look–Ahead", *IBM Technical Disclosure Bulletin, 21(6)*, (Nov., 1978),2460–2461.

Booth, Andrew, "A Signed Binary Multiplication Technique", *Oxford University Press*, Reprinted from Q.J. Mech. Appl. Math. 4:236–240, (1951), pp. 100–104.

Chakraborty, S., et al., "Synthesis of Symmetric Functions for Path–Delay Fault Testability", *12th International Conference on VLSI Design*, (1999), pp. 512–517.

Dadda, L., "On Parallel Digital Multipliers", *Associazione Elettrontecnia ed Elettronica Italiana*, Reprinted from Alta Freq. 45:574–580, (1976), pp. 126–132.

Dadda, L., "Some Schemes For Parallel Multipliers", *Associazione Elettrotenica ed Elettronica Italiana*, Reprinted from Alta Freq. 34:349–356, (1965), pp. 118–125.

Debnath, D., "Minimization of AND–OR–EXOR Three–Level Networks with AND Gate Sharing", *IEICE Trans. Inf. & Syst.*, vol. E80–D, No. 10, (1997), pp. 1001–1008.

Drechsler, R., et al., "Sympathy: Fast Exact Minimization of Fixed Polarity Reed–Muller Expressions for Symmetric Functions", *IEEE*, (1995), pp. 91–97.

Drechsler, R., et al., "Sympathy: Fast Exact Minimization of Fixed Polarity Reed–Muller Expressions for Symmetric Functions", *IEEE Transactions on Computer–Aided Design of Integrated Circuits and Systems*, vol. 16, No. 1, (1997), pp. 1–5.

Fleisher, H., "Combinatorial Techniques for Performing Arithmetic and Logical Operations", *IBM Research Center, RC–289, Research Report*, (Jul. 18, 1960), pp. 1–20.

Foster, Caxton, et al., "Counting Responders in an Associative Memory", *The Institute of Electrical and Electronics Engineers, Inc.*, Reprinted, with permission, from IEEE Trans. Comput. C–20:1580–1583, (1971), pp. 86–89.

Ho, I., et al., "Multiple Addition by Residue Threshold Functions and Their Representation By Array Logic", *The Institute of Electrical and Electronics Engineers, Inc.*, Reprinted, with permission from IEEE Trans. Comput. C–22: 762–767, (1973), pp. 80–85.

Jones, Robert, et al., "Parallel Counter Implementation", *IEEE*, (1992), pp. 381–385.

Nienhaus, H., "Efficient Multiplexer Realizations of Symmetric Functions", *IEEE*, (1981), pp. 522–525.

Oklobdzija, V.G., et al., "Improving Multiplier Design by Using Improved Column Compression Tree and Optimized Final Adder in CMOS Technology", *IEEE Transactions on Very Large Scale Integration (VLSI) Systems*, vol. 3, No. 2, (1995), pp. 292–301.

Swartzlander, Jr., Earle, "Parallel Counters", *Institute of Electrical and Electronic Engineers, Inc.*, Reprinted, with permission from IEEE Trans. Comput. C–22:1021–1024, (1973), pp. 90–93.

Vassiliadis, S., et al., "7/2 Counters and Multiplication with Threshold Logic", *IEEE*, (1997), pp. 192–196.

Wallace, C., "A Suggestion for a Fast Multiplier", *IEEE Transactions on Electronic Computers*, (1964), pp. 14–17.

Zuras, D, et al., "Balanced Delay Trees and Combinatorial Division in VLSI", *IEEE Journal of Solid State Circuits, SC–21*, IEEE Inc, New York, vol. SC–21, No. 5, (1986), pp. 814–819.

Goto, et al., "A 54 x 54–b Regularly Structured Tree Multiplier", *IEEE Journal of Solid–State Circuits, vol. 27, No. 9*, (Sep. 1992), 1229–1236.

Hekstra, et al., "A Fast Parallel Multiplier Architecture", *IEEE International Symposium on Circuits and Systems; Institute of Electrical and Electronic Engineers, c1977–c1996, 20v. :28cm*, (1992),2128–2131.

Bedrij, O. J., "Carry–Select Adder", *IRE Trans., EC–11*, (Jun. 1962),340–346.

Knowles, S., "A Family of Adders", *Proc. 14th IEEE Symp. on Computer Arithmetic*, (1990),30–34.

Kogge, P. M., et al., "A Parallel Algorithm for the Efficient Solution of a General Class of Recurrence Equations", *IEEE Trans. Computers, vol. C–22, No. 8*, (Aug. 1973),786–793.

Ladner, Richard E., et al., "Parallel Prefix Computation", *Journal of ACM, vol. 27, No. 4*, (Oct. 1980),831–838.

Ling, Huey, "High–Speed Binary Adder", *IBM Journal of Research and Development, vol. 25, No. 3*, (1981),156–166.

Sklansky, J., "Conditional–Sum Addition Logic", *IRE Trans., EC–9*, (Jun. 1960),226–231.

Weinberger, A., et al., "A Logic for High–Speed Addition", *Nat. Bur. Stand. Circ., 591*, (1958),3–12.

"Communication Pursuant to Article 96(2) EPC, for application No. EP 02 722 402.1, date mailed Jun. 6, 2005", 3 pages.

Song, Paul, J., et al., "Circuit and Architecture Trade–offs for High–Speed Multiplication", *IEEE Journal of Solid–State Circuits, vol. 26, No. 9*, (Sep. 1991),1184–1198.

OR_3_1

OR_5_1

EXOR_7_1

BLOCK 4

BLOCK 5

PRIOR ART $A_7B_0$ $A_6B_0$ $A_5B_0$ $A_4B_0$ $A_3B_0$ $A_2B_0$ $A_1B_0$ $A_0B_0$
Z $A_7B_1$ $A_6B_1$ $A_5B_1$ $A_4B_1$ $A_3B_1$ $A_2B_1$ $A_1B_1$ $A_0B_1$
$A_7B_2$ $A_6B_2$ $A_5B_2$ $A_4B_2$ $A_3B_2$ $A_2B_2$ $A_1B_2$ $A_0B_2$
$A_7B_3$ $A_6B_3$ $A_5B_3$ $A_4B_3$ $A_3B_3$ $A_2B_3$ $A_1B_3$ $A_0B_3$
$A_7B_4$ $A_6B_4$ $A_5B_4$ $A_4B_4$ $A_3B_4$ $A_2B_4$ $A_1B_4$ $A_0B_4$
$A_7B_5$ $A_6B_5$ $A_5B_5$ $A_4B_5$ $A_3B_5$ $A_2B_5$ $A_1B_5$ $A_0B_5$
$A_7B_6$ $A_6B_6$ $A_5B_6$ $A_4B_6$ $A_3B_6$ $A_2B_6$ X $A_0B_6$
$A_7B_7$ $A_6B_7$ $A_5B_7$ $A_4B_7$ $A_3B_7$ $A_2B_7$ Y

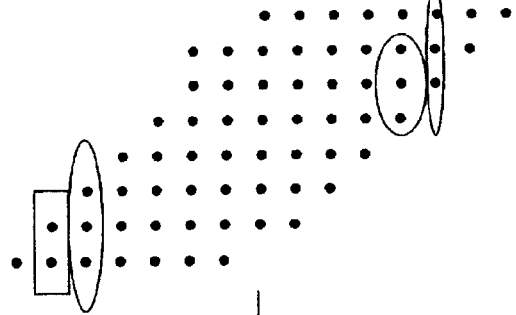

15 14 13 12 11 10 9 8 7 6 5 4 3 2 1 0  - column numbers

↓ using 1 HA, 3 FA-s, and 8 higher parallel counters

↓ using 9 FA-s and 3 HA-s

PARALLEL COUNTER AND A LOGIC CIRCUIT FOR PERFORMING MULTIPLICATION

This application is a continuation-in-part of application Ser. No. 09/769,954, filed Jan. 25, 2001.

FIELD OF THE INVENTION

The present invention generally relates to digital electronic devices and more particularly to a digital electronic device performing binary logic. In one aspect the present invention relates to a parallel counter and in another aspect the present invention relates to a logic circuit which implements the multiplication of binary numbers.

BACKGROUND OF THE INVENTION

It is instrumental for many applications to have a block that adds n inputs of the same binary weight together. An output of this block is a binary representation of the number of high inputs. Such blocks, called parallel counters (L. Dadda, *Some Schemes for Parallel Multipliers*, Alta Freq 34: 349–356 (1965); E. E. Swartzlander Jr., *Parallel Counters*, IEEE Trans. Comput. C-22: 1021–1024 (1973)) (the content of which is hereby incorporated by reference), are used in circuits performing binary multiplication. There are other applications of a parallel counter, for instance, majority-voting decoders or RSA encoders and decoders. It is important to have an implementation of a parallel counter that achieves a maximal speed. It is known to use parallel counters in multiplication (L. Dadda, *On Parallel Digital Multipliers*, Alta Freq 45: 574–580 (1976)) (the content of which is hereby incorporated by reference).

A full adder is a special parallel counter with a three-bit input and a two-bit output. A current implementation of higher parallel counters i.e. with a bigger number of inputs is based on using full adders (C. C. Foster and F. D. Stockton, *Counting Responders in an Associative Memory*, IEEE Trans. Comput. C-20: 1580–1583 (1971)) (the content of which is hereby incorporated by reference). In general, the least significant bit of an output is the fastest bit to produce in such implementation while other bits are usually slower.

The following notation is used for logical operations:

$\oplus$—Exclusive OR;

$\vee$—OR;

$\wedge$—AND;

$\neg$—NOT.

An efficient prior art design (Foster and Stockton) of a parallel counter uses full adders. A full adder, denoted FA, is a three-bit input parallel counter shown in FIG. 1. It has three inputs $X_1, X_2, X_3$, and two outputs S and C. Logical expressions for outputs are $$S = X_1 \oplus X_2 \oplus X_3,$$

$$C = (X_1 \wedge X_2) \vee (X_1 \wedge X_3) \vee (X_2 \wedge X_3).$$

A half adder, denoted HA, is a two bit input parallel counter shown in FIG. 1. It has two inputs $X_1, X_2$ and two outputs S and C. Logical expressions for outputs are $$S = X_1 \oplus X_2,$$

$$C = X_1 \wedge X_2.$$

A prior art implementation of a seven-bit input parallel counter illustrated in FIG. 2.

A paper by Irving T. To and Tien Chi Chen entitled "Multiple Addition by Residue Threshold Functions and Their Representation by Array Logic" (IEEE Trans. Comput. C-22:762–767 (1973)) (the content of which is hereby incorporated by reference) discloses a method of adding together a collection of numbers using exact symmetric functions to implement residue threshold functions. This arrangement provides some improvement in speed over conventional full adders but requires a large increase in area due to the need to compute exactly.

Multiplication is a fundamental operation. Given two n-digit binary numbers $$A_{n-1}2^{n-1} + A_{n-2}2^{n-2} + \ldots + A_1 2 + A_0 \text{ and } B_{n-1}2^{n-1} + B_{n-2}2^{n-2} + \ldots + B_1 2 + B_0,$$

their product $$P_{2n-1}2^{2n-1} + P_{2n-2}2^{2n-2} + \ldots + P_1 2 + P_0$$

may have up to 2n digits. Logical circuits generating all $P_i$ as outputs generally follow the scheme in FIG. 14. Wallace has invented the first fast architecture for a multiplier, now called the Wallace-tree multiplier (Wallace, C. S., *A Suggestion for a Fast Multiplier*, IEEE Trans. Electron. Comput. EC-13: 14–17 (1964)) (the content of which is hereby incorporated by reference). Dadda has investigated bit behaviour in a multiplier (L. Dadda, *Some Schemes for Parallel Multipliers*, Alta Freq 34: 349–356 (1965)) (the content of which is hereby incorporated by reference). He has constructed a variety of multipliers and most parallel multipliers follow Dadda's or Wallace's scheme.

Dadda's multiplier uses the scheme in on FIG. 22. If inputs have 8 bits then 64 parallel AND gates generate an array shown in FIG. 23. The AND gate Sign $\wedge$ is omitted for clarity so that $A_i \wedge B_j$ becomes $A_i B_j$. The rest of FIG. 23 illustrates array reduction that involves full adders (FA) and half adders (HA). Bits from the same column are added by half adders or full adders. Some groups of bits fed into a full adder are in rectangles. Some groups of bits fed into a half adder are in ovals. The result of array reduction is just two binary numbers to be added at the last step. One adds these two numbers by one of the fast addition schemes, for instance, conditional adder or carry-look-ahead adder.

SUMMARY OF THE INVENTION

In accordance with a first aspect, the present invention provides a parallel counter based on algebraic properties of elementary symmetric functions. Each of the plurality of binary output bits is generated as an elementary symmetric function of a plurality of binary input bits.

The elementary symmetric functions comprise logically AND combining sets of one or more binary inputs and logically OR or exclusive OR logic combining the logically combined sets of binary inputs to generate a binary output. The OR and the exclusive OR symmetric functions are elementary symmetric functions and the generated output binary bit depends only on the number of high inputs among the input binary bits. For the OR symmetric function, if the number of high inputs is m, the output is high if and only if $m \geq k$, where k is the size of the sets of binary inputs. Similarly, the generated output binary bit using the exclusive OR symmetric function is high if and only if $m \geq k$ and the number of subsets of inputs of the set of high inputs is an odd number. In one embodiment the size of the sets can be selected. The $i^{th}$ output bit can be generated using the symmetric function using exclusive OR logic by selecting the set sizes to be of size $2^i$, where i is an integer from 1 to N, N is the number of binary outputs, and i represents the significance of each binary output.

In one embodiment the sets of binary inputs used in the elementary symmetric functions are each unique and they cover all possible combinations of binary inputs.

In one embodiment of the present invention, the logic circuit is divided into a plurality of logic units. Each logic unit is arranged to generate logic unit binary outputs as a symmetric function of the binary inputs to the logic unit. The binary inputs are divided into inputs into a plurality of the logic units, and the binary outputs are generated using binary outputs of a plurality of the logic units.

This embodiment reduces the amount of fan-out in the circuit and increases the amount of logic sharing. It thus makes parallel counters for a large binary number more practicable.

In one embodiment of the present invention, the logic circuit is divided into a plurality of logic units arranged hierarchically. Each logic unit is arranged to generate logic unit binary outputs as an elementary symmetric function of the binary inputs to the logic unit. Logic units at the or each lower level of the hierarchy are included in the logic of logic units at the or each higher level in the hierarchy and have more inputs.

In a specific embodiment of the present invention, the logic and inputs of the parallel counter are divided in accordance with a binary tree. The logic circuit is divided into a plurality of logic units. Each logic unit is arranged to generate logic unit binary outputs as an elementary symmetric function of the binary inputs to the logic unit. The binary inputs are divided into inputs into the plurality of logic units, and the binary outputs of the plurality of outputs are generated using binary outputs of a plurality of the logic units.

In a preferred embodiment, each of the logic units is arranged to receive $2^n$ of the binary inputs, where n is an integer indicating the level of the logic units in the binary tree, the logic circuit has m logic units at each level, where m is a rounded up integer determined from (the number of binary inputs)/$2^n$, logic units having a higher level in the binary tree comprise logic of logic units at lower levels in the binary tree, and each logic unit is arranged to generate logic unit binary outputs as an elementary symmetric function of the binary inputs to the logic unit.

In one embodiment, each logic unit at the first level is arranged to generate logic unit binary outputs as a smallest elementary symmetric function of the binary inputs to said logic circuit.

In one embodiment, each logic unit at the first level is arranged to generate logic unit binary outputs as an elementary symmetric function of the binary inputs to the logic circuit using OR logic for combining the binary inputs.

In one embodiment, each logic unit at the first level is arranged to logically AND each of the binary inputs to the logic unit and to logically OR each of the binary inputs to the logic unit to generate the logic unit binary outputs.

In one embodiment, each logic unit at the first level is arranged to generate logic unit binary outputs as an elementary symmetric function of the binary inputs to the logic circuit using exclusive OR logic for combining the binary inputs.

In one embodiment, each logic unit at the first level is arranged to logically AND each of the binary inputs to the logic unit and to logically exclusively OR each of the binary inputs to the logic unit to generate the logic unit binary outputs.

In one embodiment, elementary logic units are provided as the logic units at the first level for performing elementary symmetric functions, outputs from each of two primary elementary logic units receiving four logically adjacent binary inputs from said plurality of inputs are input to two secondary elementary logic units, an output from each of the secondary elementary logic units is input to a tertiary elementary logic unit, and the primary, secondary and tertiary elementary logic units form a secondary logic unit at a second level of the binary tree having a binary output comprising a binary output from each of the secondary elementary logic units and two binary outputs from the tertiary elementary logic unit.

In one embodiment, tertiary logic units at a third level of the binary tree each comprise two secondary logic units receiving eight logically adjacent binary inputs from the plurality of inputs, four elementary logic units receiving as inputs the outputs of the two secondary logic units, and further logic for generating binary outputs as an elementary symmetric function of the binary inputs to the tertiary logic unit using the binary outputs of the four elementary logic units.

In one embodiment, quaternary logic units at a fourth level of the binary tree each comprise two tertiary logic units receiving sixteen logically adjacent binary inputs from the plurality of inputs, four elementary logic units receiving as inputs the outputs of the two tertiary logic units, and further logic for generating binary outputs as an elementary symmetric function of the binary inputs to the quaternary logic unit using the binary outputs of the four elementary logic units.

In one embodiment, elementary logic units are provided as the logic units at the first level for performing the smallest elementary symmetric functions, and logic units for higher levels comprise logic units of lower levels.

In one embodiment, the logic units for higher levels above the second level comprise logic units of an immediately preceding level and elementary logic units.

In one embodiment, each logic unit at each level is arranged to generate logic unit binary outputs as an elementary symmetric function of the binary inputs to the logic circuit using OR logic for combining the binary inputs.

In one embodiment, each logic unit at each level is arranged to generate logic unit binary outputs as an elementary symmetric function of the binary inputs to the logic circuit using exclusive OR logic for combining the binary inputs.

In one embodiment of the present invention, each of the binary outputs can be generated using an elementary symmetric function which uses exclusive OR logic. However, exclusive OR logic is not as fast as OR logic.

In accordance with another embodiment of the present invention at least one of the binary outputs is generated as an elementary symmetric function of the binary inputs using OR logic for combining a variety of sets of one or more binary inputs. The logic is arranged to logically AND members of each set of binary inputs and logically OR the result of the AND operations.

Thus use of the elementary symmetric function using OR logic is faster and can be used for generation of the most significant output bit. In such an embodiment the set size is set to be $2^{N-1}$, where N is the number of binary outputs and the $N^{th}$ binary output is the most significant.

It is also possible to use the elementary symmetric function using OR logic for less significant bits on the basis of the output value of a more significant bit. In such a case, a plurality of possible binary outputs for a binary output less significant than the $N^{th}$ are generated as elementary symmetric functions of the binary inputs using OR logic for combining a plurality of sets of one or more binary inputs, where N is the number of binary outputs. Selector logic is provided to select one of the possible binary outputs based on a more significant binary output value. The size of the sets used in such an arrangement for the $(N-1)^{th}$ bit is preferably $2^{N-1}+2^{n-2}$ and $2^{N-2}$ respectively and one of the possible binary outputs is selected based on the $N^{th}$ binary output value.

In one embodiment of the present invention the circuit is designed in a modular form. A plurality of subcircuit logic modules are designed, each for generating intermediate binary outputs as an elementary symmetric function of some of the binary inputs. Logic is also provided in this embodiment for logically combining the intermediate binary outputs to generate binary outputs.

In one embodiment of the present invention, the logic units are arranged hierarchically and at least one logic unit in at least one level of the hierarchy implements an inverted elementary symmetric function. In one arrangement, the logic units at an odd number of levels in the hierarchy implement inverted elementary symmetric functions, logic units at an even number of levels in the hierarchy implement symmetric functions, and the inputs to the logic units at the first level of the hierarchy are inverted. In another arrangement logic units at an even number of levels in the hierarchy implement inverted elementary symmetric functions, logic units at an even number of levels in the hierarchy implement symmetric functions, and the inputs to the logic units at the first level of the hierarchy are input to logic units in a first level in the hierarchy uninverted. This embodiment of the present invention allows faster inverting logic gates to be used in the logic circuit.

Since OR logic is faster, in a preferred embodiment the subcircuit logic modules implement the elementary symmetric functions using OR logic. In one embodiment the subcircuit modules can be used for generating some binary outputs and one or more logic modules can be provided for generating other binary outputs in which each logic module generates a binary output as an elementary symmetric function of the binary inputs exclusive OR logic for combining a plurality of sets of one or more binary inputs.

Another aspect of the present invention provides a method of designing a logic circuit comprising: providing a library of logic module designs each for performing a small elementary symmetric function; designing a logic circuit to perform a large elementary symmetric function; identifying small elementary symmetric functions which can perform said elementary symmetric function; selecting logic modules from said library to perform said small elementary symmetric functions; identifying a logic circuit in the selected logic circuit which performs an elementary symmetric function and which can be used to perform another elementary symmetric function; selecting the logic circuit corresponding to the identified elementary symmetric function and using the selected logic circuit with inverters to perform said other elementary symmetric function using the relationship between the elementary symmetric functions:

$$OR\_n\_k(X_1 \ldots X_n) = \neg OR\_n\_n(n+1-k)(\neg X_1 \ldots \neg X_n)$$

where $\neg$ denotes an inversion, n is the number of inputs, and k is the number of sets of inputs AND combined together.

Another aspect of the present invention provides a conditional parallel counter having m possible high inputs out of n inputs, where m<n, and n and m are integers, the counter comprising the parallel counter for counting inputs to generate p outputs for m inputs, wherein the number n of inputs to the counter is greater than $2^p$, where p is an integer.

Thus these aspects of the present invention provide a fast circuit that can be used in any architecture using parallel counters. The design is applicable to any type of technology from which the logic circuit is built.

The parallel counter in accordance with this aspect of the present invention is generally applicable and can be used in a multiplication circuit that is significantly faster than prior art implementations.

One aspect of the present invention provides a conditional parallel counter having m possible high inputs out of n inputs, where m<n, and n and m are integers. The conditional parallel counter comprises the parallel counter as described hereinabove for counting inputs to generate p outputs for m inputs, wherein the number n of inputs to the counter is greater than $2^p$. The conditional multiplier can be used in a digital filter for example.

In accordance with another aspect of the present invention a technique for multiplying binary numbers comprises an array generation step in which an array of logical combinations between the bits of the two binary numbers is generated which is of reduced size compared to the prior art.

In accordance with this aspect of the present invention, a logic circuit for multiplying two binary numbers comprises array generation logic for performing a logical binary operation between each bit in one binary number and each bit in the other binary number to generate an array of logical binary combinations comprising an array of binary values, and for further logically combining logically adjacent values to reduce the maximum depth of the array to below N bits, where N is the number of bits of the largest of the two binary numbers; array reduction logic for reducing the depth of the array to two binary numbers; and addition logic for adding the binary values of the two binary numbers.

In one embodiment, when two binary numbers are multiplied together, as is conventional, each bit $A_i$ of the first binary number is logically combined with each bit $B_j$ of the second number to generate the array which comprises a sequence of binary numbers represented by the logical combinations, $A_i$ and $B_j$. The further logical combinations are carried out by logically combining the combinations $A_1$ and $B_{N-2}$, $A_1$ and $B_{N-1}$, $A_0$ and $B_{N-2}$, and $A_0$ and $B_{N-1}$, where N is the number of bits in the binary numbers. In this way the size of the maximal column of numbers to be added together in the array is reduced.

More specifically the array generation logic is arranged to combine the combinations $A_1$ AND $B_{n-2}$ and $A_0$ AND $B_{n-1}$ using exclusive OR logic to replace these combinations and to combine $A_1$ AND $B_{N-1}$ and $A_0$ AND $B_{n-2}$ to replace the $A_1$ AND $B_{n-1}$ combination.

In one embodiment of the present invention the array reduction logic can include at least one of: at least one fall adder, at least one half adder, and at least one parallel counter. The or each parallel counter can comprise the parallel counter in accordance with the first aspects of the present invention.

This aspect of the present invention provides a reduction of the maximal column length in the array thereby reducing the number of steps required for array reduction. When the first aspect of the present invention is used in conjunction with the second aspect of the present invention, an even more efficient multiplication circuit is provided.

One embodiment of the present invention provides a multiply-accumulate logic circuit comprising the logic circuit as described hereinabove, wherein said array generation logic is arranged to include an accumulation of previous multiplications.

Another aspect of the present invention provides a logic circuit comprising at least four inputs for receiving a binary number as a plurality of binary inputs; at least one output for outputting binary code; and logic elements connected between the plurality of inputs and the or each binary output and for generating the or each binary output in accordance with a threshold function implemented as a binary tree and having a threshold of at least 2. A threshold function is a function which is high if, and only if, at least a threshold number k of the inputs are high, where $k \geq 2$.

In one embodiment of this aspect of the present invention, the logic elements are arranged to generate the or each binary output as an elementary symmetric function of the binary inputs i.e. the threshold function is implemented as an elementary symmetric function.

Another aspect of the present invention provides a logic circuit comprising at least four inputs for receiving a binary number as a plurality of binary inputs; at least one output for outputting binary code; and logic elements connected between the plurality of inputs and the plurality of binary outputs arranged to generate the or each of the plurality of binary outputs as an elementary symmetric function of the binary inputs.

A further aspect of the present invention provides a method and system for designing a logic circuit comprising a plurality of inputs for receiving a binary number as a plurality of binary inputs, at least one output for outputting binary code, and logic elements connected between the plurality of inputs and the or each binary output and arranged to generate the or each binary output as a threshold function of the binary inputs. The method comprises determining logic elements for performing the threshold functions; and reducing the logic elements by identifying logic elements performing a logical AND of two threshold functions and reducing the identified logic elements to logic elements for performing the threshold function having the higher threshold, and identifying logic elements performing a logical OR of two threshold functions and reducing the identified logic elements to logic elements for performing the threshold function having the lower threshold.

This aspect of the present invention can be implemented in software using a computer system comprising one or multiple networked computers. The invention thus encompasses program code for controlling a computer system. The code can be provided to the computer system on any suitable carrier medium such as a storage medium e.g. a floppy disk, hard disk, CD ROM, or programmable memory device, or a transient medium e.g. an electrical, optical, microwave, acoustic, or RF signal. An example of a transient medium is a signal carrying the code over a network such as the Internet.

A further aspect of the present invention provides a method and system for designing a logic circuit comprising a plurality of inputs for receiving a binary number as a plurality of binary inputs, at least one output for outputting binary code, and logic elements connected between the plurality of inputs and the binary outputs and arranged to generate each binary output as a symmetric function of the binary inputs. The method comprises designing the logic circuit using exclusive OR logic; identifying any logic which cannot have inputs that are high at the same time; and replacing the identified exclusive OR logic with OR logic.

In one embodiment of this aspect of the present invention, the logic circuit is designed to generate each binary output as an elementary symmetric function of the binary inputs.

In a specific embodiment of this aspect of the present invention, the logic circuit comprises a parallel counter.

This aspect of the present invention can be implemented in software using a computer system comprising one or multiple networked computers. The invention thus encompasses program code for controlling a computer system. The code can be provided to the computer system on any suitable carrier medium such as a storage medium e.g. a floppy disk, hard disk, CD ROM, or programmable memory device, or a transient medium e.g. an electrical, optical, microwave, acoustic, or RF signal. An example of a transient medium is a signal carrying the code over a network such as the Internet.

A further aspect of the present invention provides a method and system for designing a logic circuit comprising providing a library of logic module designs each for performing a small symmetric function; designing a logic circuit to perform a large symmetric function; identifying small symmetric functions which can perform said symmetric function; selecting logic modules from said library to perform said small symmetric functions; identifying a logic circuit in the selected logic circuit which performs a symmetric function and which can be used to perform another symmetric function; and selecting the logic circuit corresponding to the identified symmetric function and using the selected logic circuit with inverters to perform said other symmetric function using the relationship between the symmetric functions:

$$OR\_n\_k(X_1 \ldots X_n) = \neg OR\_n\_(n+1-k)(\neg X_1 \ldots \neg X_n)$$

where $\neg$ denotes an inversion, n is the number of inputs, and k is the number of sets of inputs AND combined together.

In one embodiment of this aspect of the present invention, the symmetric functions are elementary symmetric functions.

This aspect of the present invention can be implemented in software using a computer system comprising one or multiple networked computers. The invention thus encompasses program code for controlling a computer system. The code can be provided to the computer system on any suitable carrier medium such as a storage medium e.g. a floppy disk, hard disk, CD ROM, or programmable memory device, or a transient medium e.g. an electrical, optical, microwave, acoustic, or RF signal. An example of a transient medium is a signal carrying the code over a network such as the Internet.

BRIEF DESCRIPTION OF THE DRAWINGS

Embodiments of the present invention will now be described with reference to the accompanying drawings, in which:

FIG. 32 is a diagram illustrating array deformation in accordance with the embodiment of the present invention and the subsequent steps of array reduction and adding.

DETAINED DESCRIPTION OF PREFERRED EMBODIMENTS

A first aspect of the present invention will now be described.

The first aspect of the present invention relates to a parallel counter counting the number of high values in a binary number. The counter has i outputs and n inputs where i is determined as being the integer part of $\log_2$ n plus 1

A mathematical basis for the first aspect of the present invention is a theory of symmetric functions. We denote by $C^n_k$ the number of distinct k element subsets of a set of n elements. We consider two functions EXOR_n_k and OR_n_k of n variables $X_1, X_2, \ldots X_n$ given by $$EXOR\_n\_k(X_1, X_2, \ldots X_n) = \oplus (X_{i1} \wedge X_{i2} \wedge \ldots \wedge X_{ik}),$$

$$OR\_n\_k(X_1, X_2, \ldots X_n) = \vee (X_{i1} \wedge X_{i2} \wedge \ldots \wedge X_{ik})$$

where (i1, i2, . . . ik) runs over all possible subsets of $\{X_1, X_2, \ldots X_n\}$ that contain precisely k elements. Blocks that produce such outputs are shown on FIG. 3.

The functions EXOR_n_k and OR_n_k are elementary symmetric functions. Their values depend only on the number of high inputs among $X_1, X_2, X_3, \ldots X_n$. More precisely, if m is the number of high inputs among $X_1, X_2, X_3, \ldots X_n$ then OR_n_k($X_1, X_2, \ldots X_n$) is high if and only if m≧k. Similarly, EXOR_n_k($X_1, X_2, \ldots X_n$) is high if and only if m≧k and $C^m_k$ is odd.

Although EXOR_n_k and OR_n_k look similar, OR_n_k is much faster to produce since EXOR-gates are slower than OR-gates.

Figure 4:
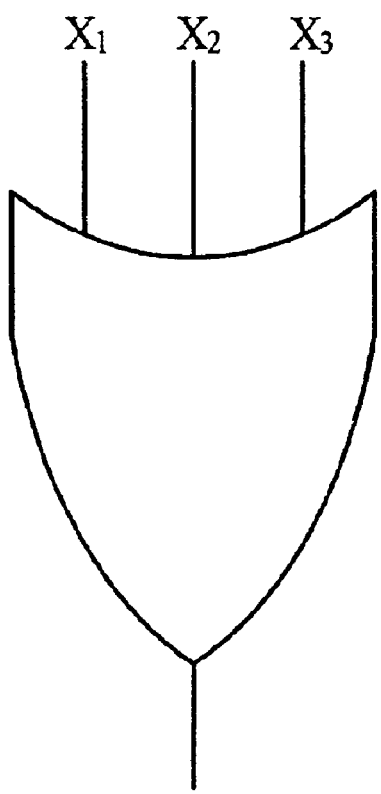
FIG. 4 is a diagram illustrating the logic for implementing the symmetric function OR_3_1 according to one embodiment of the present invention.

In the above representation n is the number of inputs and k is the size of the subset of inputs selected. Each set of k inputs is a unique set and the subsets comprise all possible subsets of the set of inputs. For example, the symmetric function OR_3_1 has three inputs $X_1$, $X_2$ and $X_3$ and the set size is 1. Thus the sets comprise $X_1$, $X_2$ and $X_3$. Each of these sets is then logically OR combined to generated the binary output. The logic for performing this function is illustrated in FIG. 4.

Figure 5:
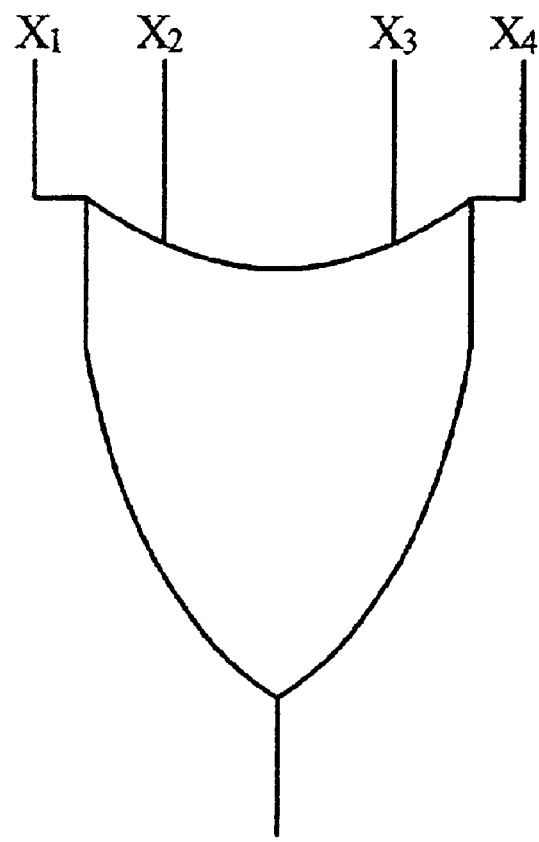
FIG. 5 is a diagram illustrating the logic for implementing the symmetric function OR_4_1 according to one embodiment of the present invention.

FIG. 5 illustrates the logic for performing the symmetric OR_4_1.

When the number of inputs become large, it may not be possible to use simple logic.

Figure 6:
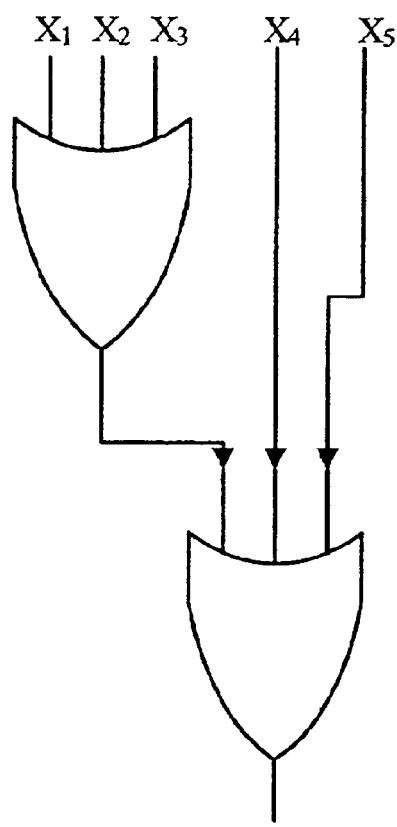
FIG. 6 is a diagram illustrating the logic for implementing the symmetric function OR_5_1 using 23 input OR gates according to one embodiment of the present invention.

FIG. 6 illustrates the use of two OR gates for implementing the symmetric function OR_5_1.

Figure 7:
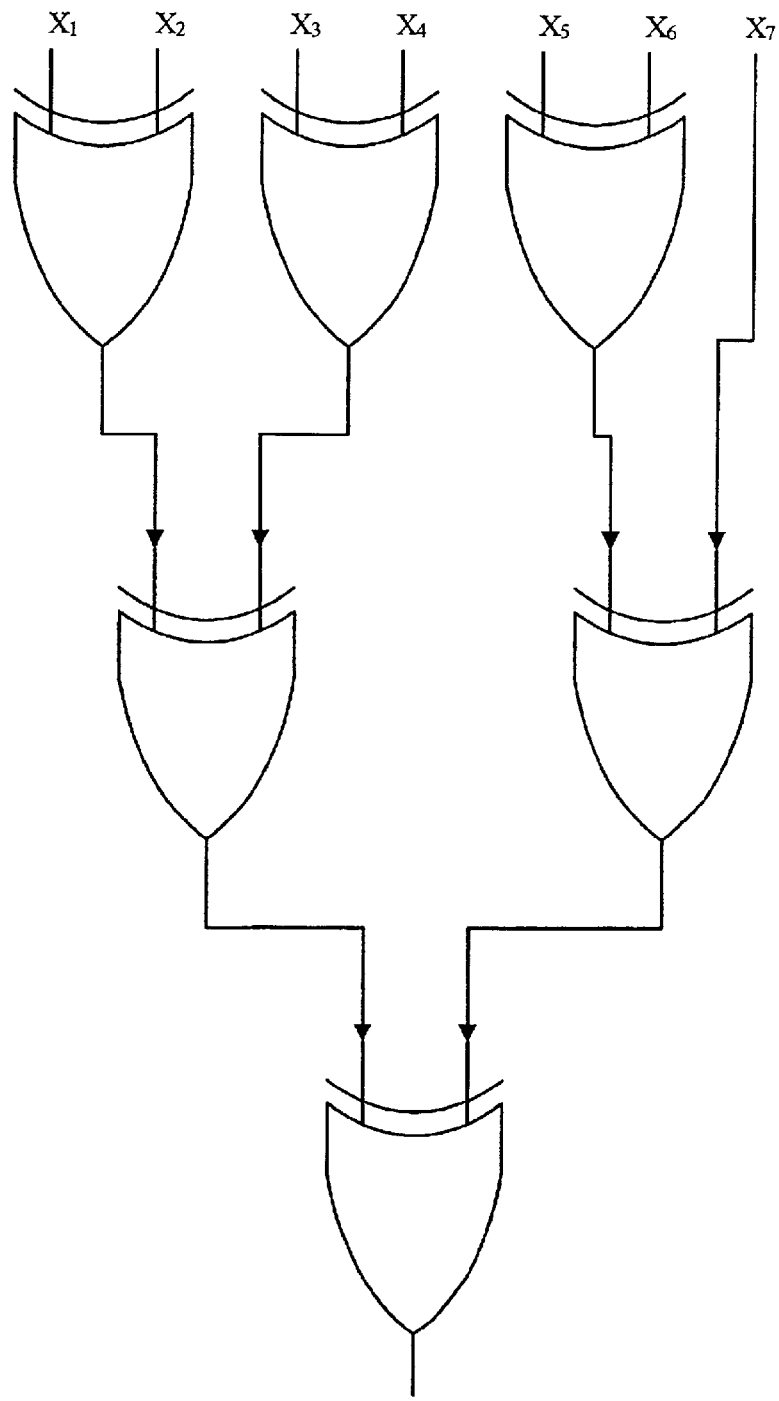
FIG. 7 is a diagram illustrating the logic for implementing the symmetric function EXOR_7_1 using two input exclusive OR gates according to one embodiment of the present invention.

FIG. 7 similarly illustrates the logic for performing EXOR_7_1. The sets comprise the inputs $X_1$, $X_2$, $X_3$, $X_4$, $X_5$, $X_6$, and $X_7$. These inputs are input into three levels of exclusive OR gates.

When k is greater than 1, the inputs in a subset must be logically AND combined.

Figure 8:
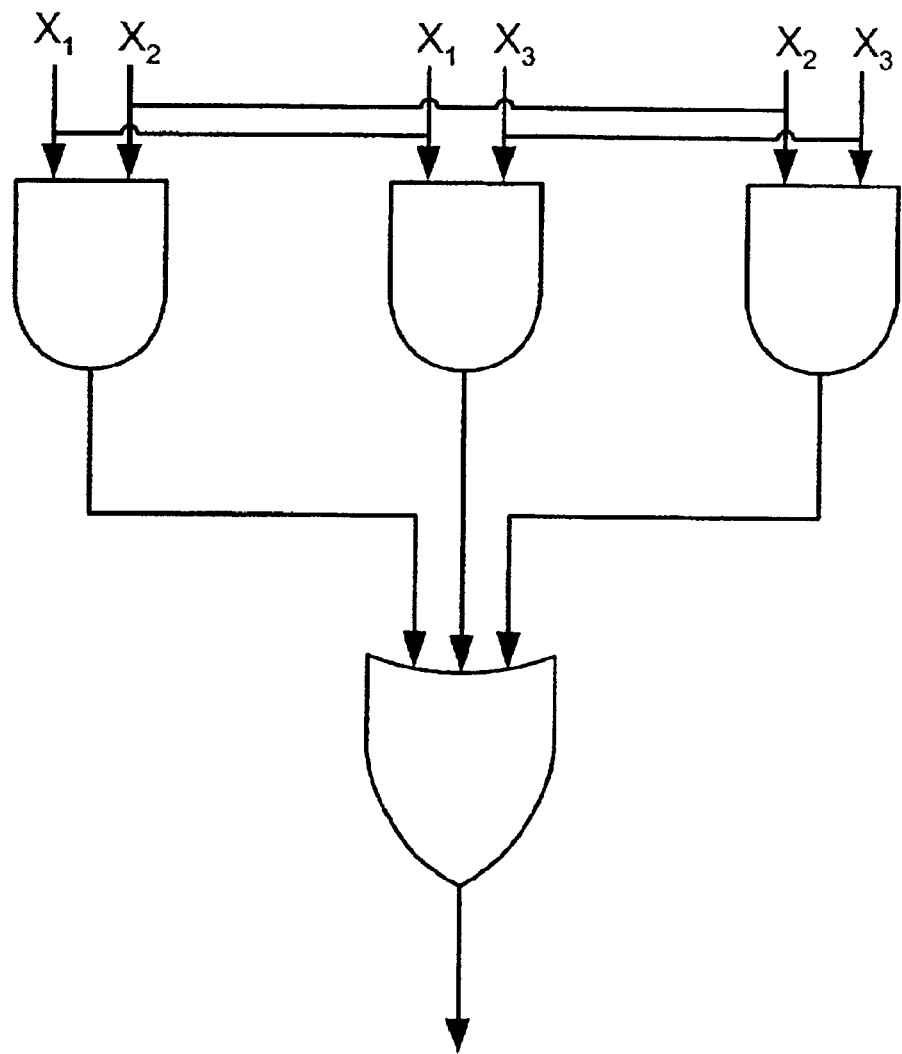
FIG. 8 is a diagram illustrating the logic for implementing the symmetric function OR_3_2 according to one embodiment of the present invention.

FIG. 8 illustrates logic for performing the symmetric function OR_3_2. The inputs $X_1$ and $X_2$ comprise the first set and are input to a first AND gate. The inputs $X_1$ and $X_3$ constitute a second set and are input to a second AND gate. The inputs $X_2$ and $X_3$ constitute a third set and are input to a third AND gate. The output of the AND gates are input to an OR gate to generate the output function.

Figure 9:
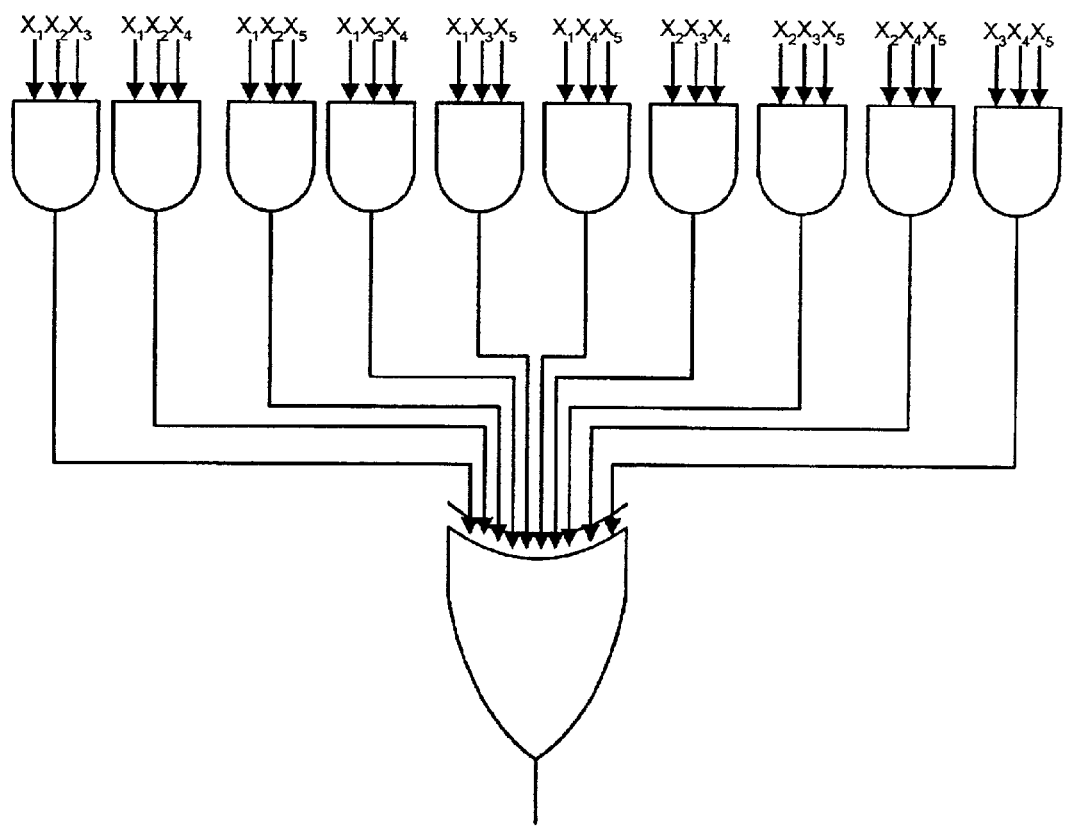
FIG. 9 is a diagram illustrating the logic for implementing the symmetric function EXOR_5_3 according to one embodiment of the present invention.

FIG. 9 is a diagram illustrating the logic for performing the symmetric function EXOR_5_3. To perform this function the subsets of size 3 for the set of five inputs comprise ten sets and ten AND gates are required. The output of the AND gates are input to an exclusive OR gate to generate the function.

The specific logic to implement the symmetric functions will be technology dependent. Thus the logic can be designed in accordance with the technology to be used.

In accordance with a first embodiment of the present invention the parallel counter of each output is generated using a symmetric function using exclusive OR logic.

Let the parallel counter have n inputs $X_1, \ldots X_n$ and t+1 outputs $S_t, S_{t-1}, \ldots S_0$. $S_0$ is the least significant bit and $S_t$ is the most significant bit. For all i from 0 to t, $$S_i = EXOR\_n\_2^i(X_1, X_2, \ldots X_n).$$

It can thus be seen that for a seven bit input i.e. n=7, i will have values of 0, 1 and 2. Thus to generate the output $S_0$ the function will be EXOR_7_1, to generate the output $S_1$ the function will be EXOR_7_2 and to generate the output $S_2$ the function will be EXOR_7_4. Thus for the least significant bit the set size (k) is 1, for the second bit the set size is 2 and for the most significant bit the set size is 4. Clearly the logic required for the more significant bits becomes more complex and thus slower to implement.

Thus in accordance with a second embodiment of the present invention, the most significant output bit is generated using a symmetric function using OR logic.

This is more practical since OR_n_k functions are faster than EXOR_n_k functions. For the most significant output bit $$S_k = OR\_n\_2^t(X_1, X_2, \ldots X_n).$$

In particular, with a seven-bit input $$S_2 = OR\_7\_4(X_1, X_2, X_3, X_4, X_5, X_6, X_7).$$

Thus in this second embodiment of the present invention the most significant bit is generated using symmetric functions using OR logic whereas the other bits are generated using symmetric functions which use exclusive OR logic.

A third embodiment will now be described in which intermediate bits are generated using symmetric functions using OR logic.

An arbitrary output bit can be expressed using OR_n_k functions if one knows bits that are more significant. For instance, the second most significant bit is given by $$S_{t-1} = (S_t \wedge OR\_n\_2^t + 2^{t-1}) \vee ((\neg S_t) \wedge OR\_n\_2^{t-1}).$$

In particular, with a seven-bit input $$S_1 = (S_2 \wedge OR\_7\_6(X_1, X_2, X_3, X_4, X_5, X_6, X_7)) \vee ((\neg S_2) \wedge OR\_7\_2(X_1, X_2, X_3, X_4, X_5, X_6, X_7)).$$

A further reduction is $$S_1 = OR\_7\_6(X_1, X_2, X_3, X_4, X_5, X_6, X_7) \vee ((\neg S_2) \wedge OR\_7\_2(X_1, X_2, X_3, X_4, X_5, X_6, X_7)).$$

Figure 3:
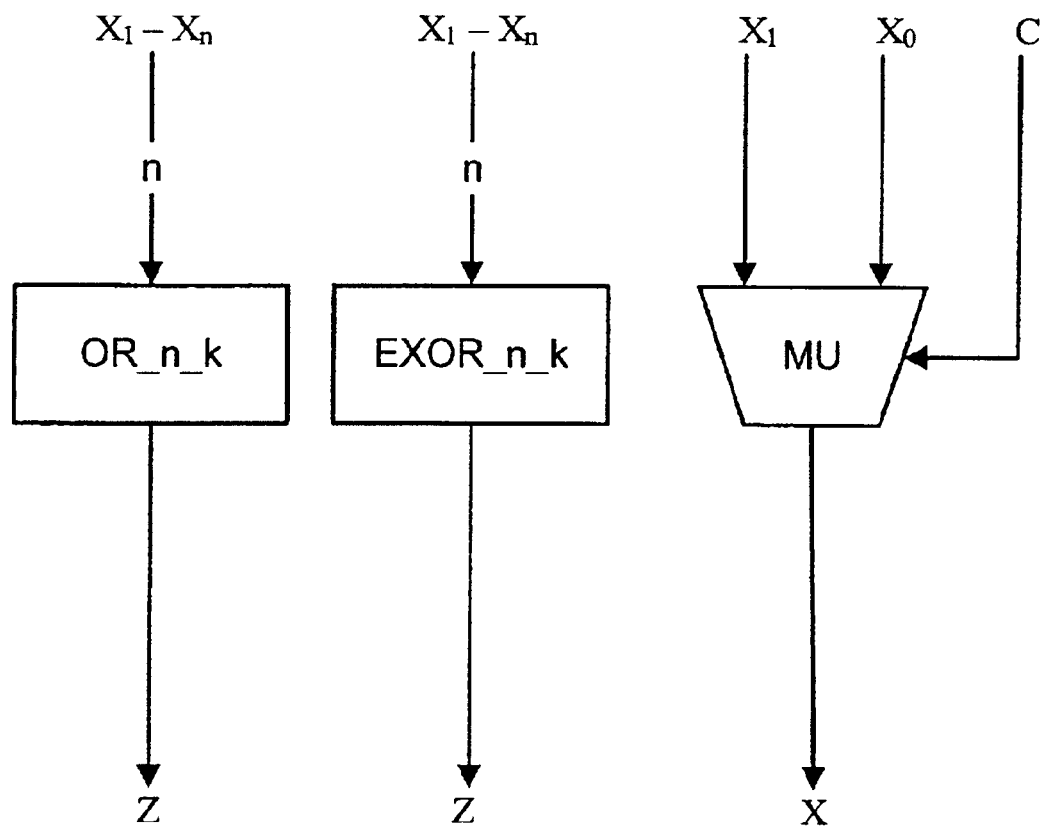
FIG. 3 is a schematic diagram illustrating the logic modules executing the symmetric functions for the generation of binary outputs and the multiplexor (selector) used for selecting outputs.

A multiplexer MU, shown in FIG. 3, implements this logic. It has two inputs $X_0$, $X_1$, a control C, and an output Z determined by the formula $$Z = (C \wedge X_1) \vee ((\neg C) \wedge X_0).$$

Figure 10:
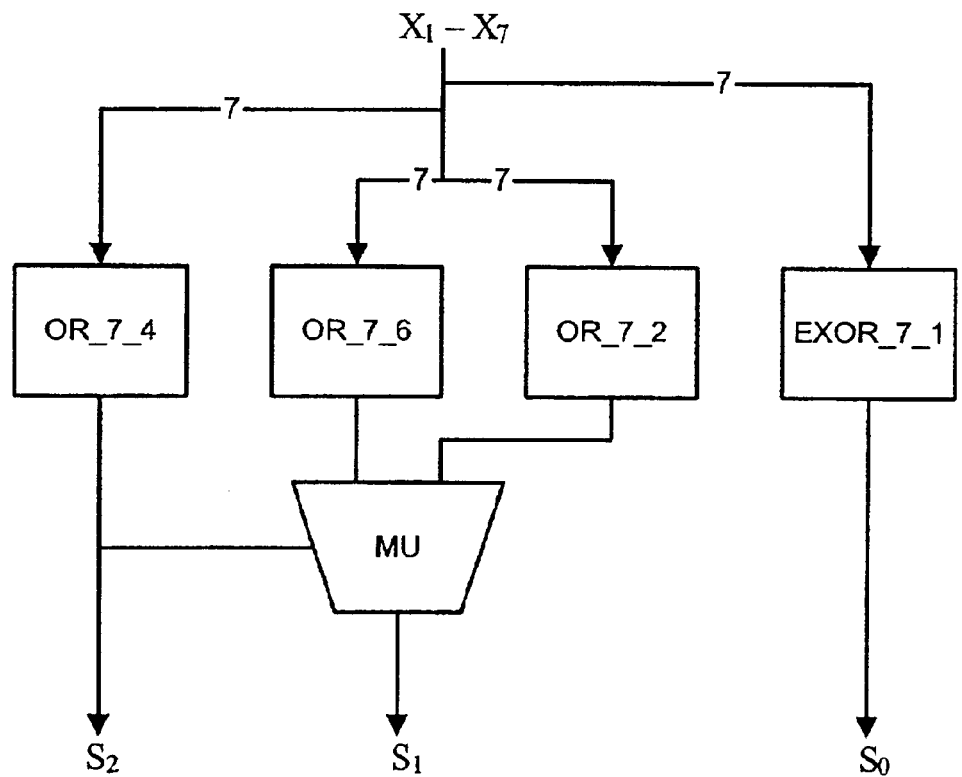
FIG. 10 is a diagram illustrating a parallel counter using the two types of symmetric functions and having seven inputs and three outputs according to one embodiment of the present invention.

It is not practical to use either EXOR_n_k functions or OR_n_k functions exclusively. It is optimal to use OR_n_k functions for a few most significant bits and EXOR_n_k functions for the remaining bits. The fastest, in TSMC.25, parallel counter with 7 inputs is shown in FIG. 10.

Future technologies that have fast OR_15_8 blocks would allow building a parallel counter with 15 inputs. A formula for the third significant bit using OR_n_m functions is thus:

$$S_{t-2} = (S_t \wedge S_{t-1} \wedge OR\_n\_2^t + 2^{t-1} + 2^{t-2}) \vee (S_t \wedge (\neg S_{t-1}) \wedge OR\_n\_2^t + 2^{t-2}) \vee$$

$$((\neg S_t) \wedge S_{t-1} \wedge OR\_n\_2^{t-1} + 2^{t-2}) \vee ((\neg S_t) \wedge (\neg S_{t-1}) \wedge OR\_n\_2^{t-2}).$$

A fourth embodiment of the present invention will now be described which divides the logic block implementing the symmetric function into small blocks which can be reused.

Figure 11:
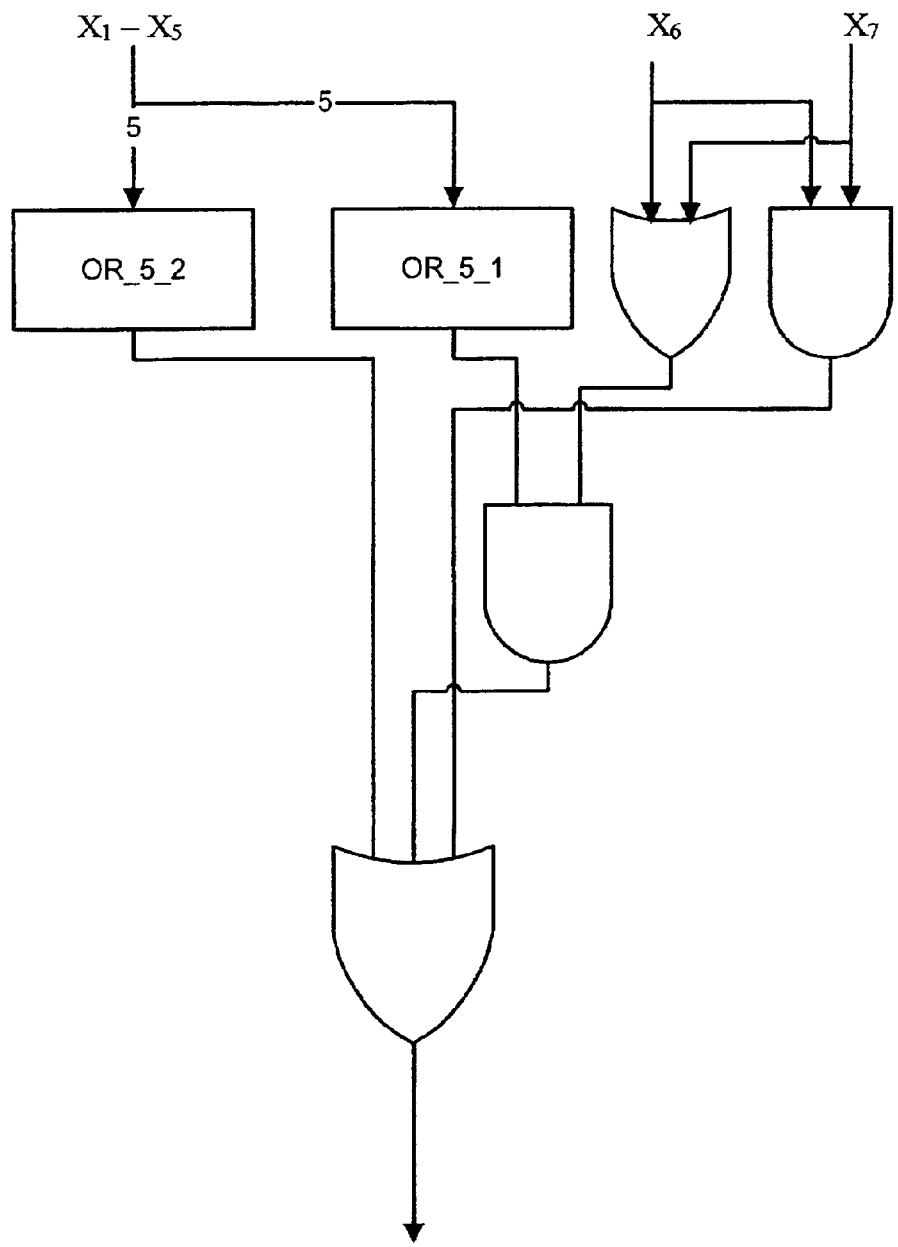
FIG. 11 is a diagram illustrating splitting of the symmetric function OR_7_2 into sub modules to allow the reusing of smaller logic blocks according to one embodiment of the present invention.

An implementation of OR_7_2 is shown in FIG. 11. The 7 inputs are split into two groups: five inputs from $X_1$ to $X_5$ and two remaining inputs $X_6$ and $X_7$. Then the following identity is a basis for the implementation in FIG. 11.

$$OR\_7\_2(X_1, \ldots, X_7) = OR\_5\_2(X_1, \ldots, X_5) \vee (OR\_5\_1(X_1, \ldots, X_5) \wedge OR\_2\_1(X_6, X_7)) \vee OR\_2\_2(X_6, X_7)$$

One can write similar formulas for OR_7_4 and OR_7_6. Indeed, $$OR\_7\_4(X_1, \ldots, X_7) = OR\_5\_4(X_1, \ldots, X_5) \vee$$

$$(OR\_5\_3(X_1, \ldots X_5) \wedge OR\_2\_1(X_6, X_7)) \vee$$

$$(OR\_5\_5(X_1, \ldots, X_5) \wedge OR\_2\_2(X_6, X_7)),$$

$$OR\_7\_6(X_1, \ldots, X_7) =$$

$$(OR\_5\_5(X_1, \ldots X_5) \wedge OR\_2\_1(X_6, X_7)) \vee$$

$$(OR\_5\_4(X_1, \ldots X_5) \wedge OR\_2\_2(X_6, X_7)).$$

Thus, it is advantageous to split variables and reuse smaller OR_n_k functions in a parallel counter. For instance, an implementation of a parallel counter based on partitioning seven inputs into groups of two and five is in FIG. 12.

Similarly, one can partition seven inputs into groups of four and three. An implementation of the parallel counter based on this partition is in FIG. 13. One uses the following logic formulas in this implementation.

Figure 12:
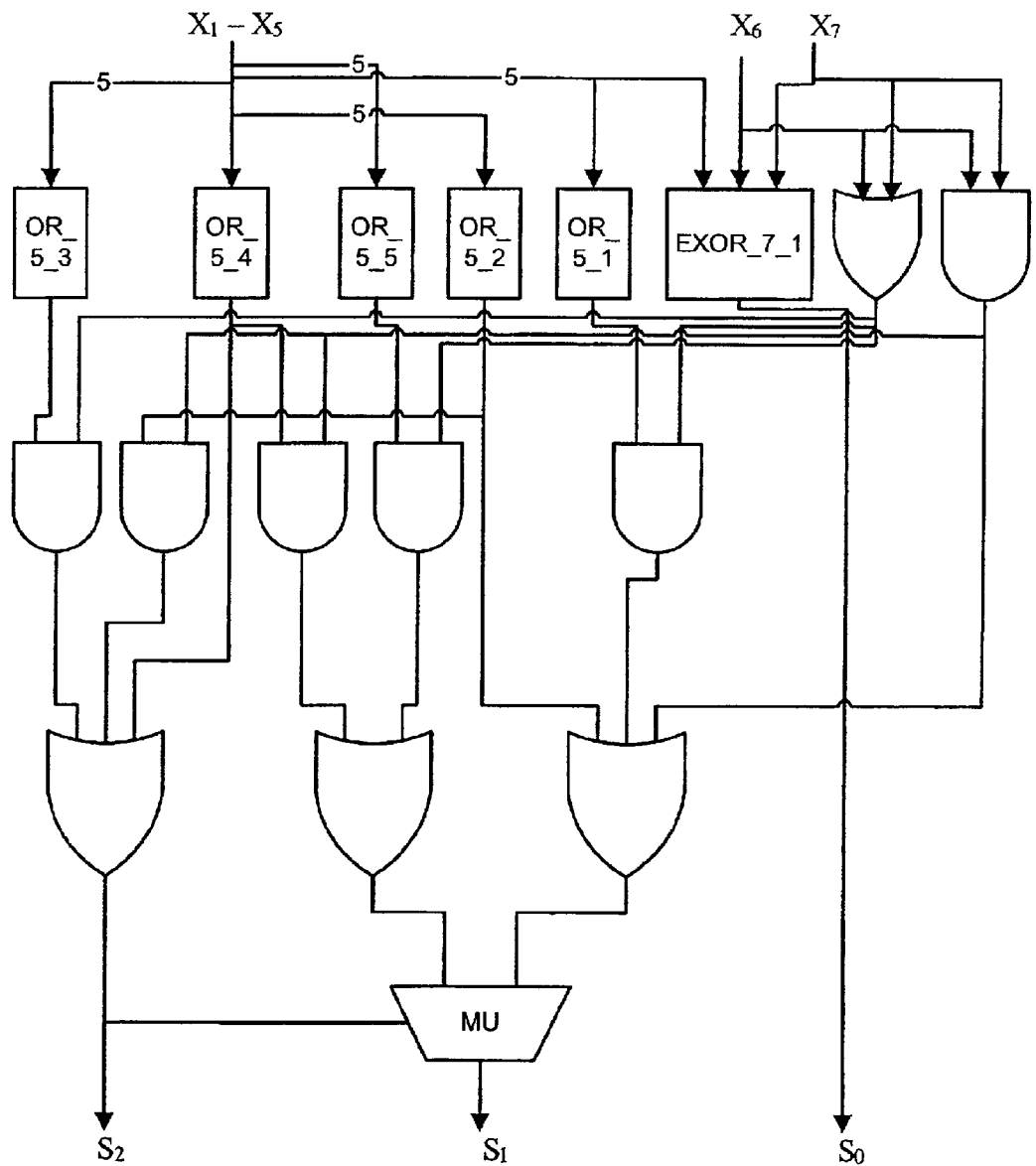
FIG. 12 is a diagram of a parallel counter using the EXOR_7_1 symmetric function for the generation of the least significant output bit from all of the input bits, and smaller modules implementing symmetric functions using OR logic to generate the second and third output bits according to one embodiment of the present invention.
Figure 13:
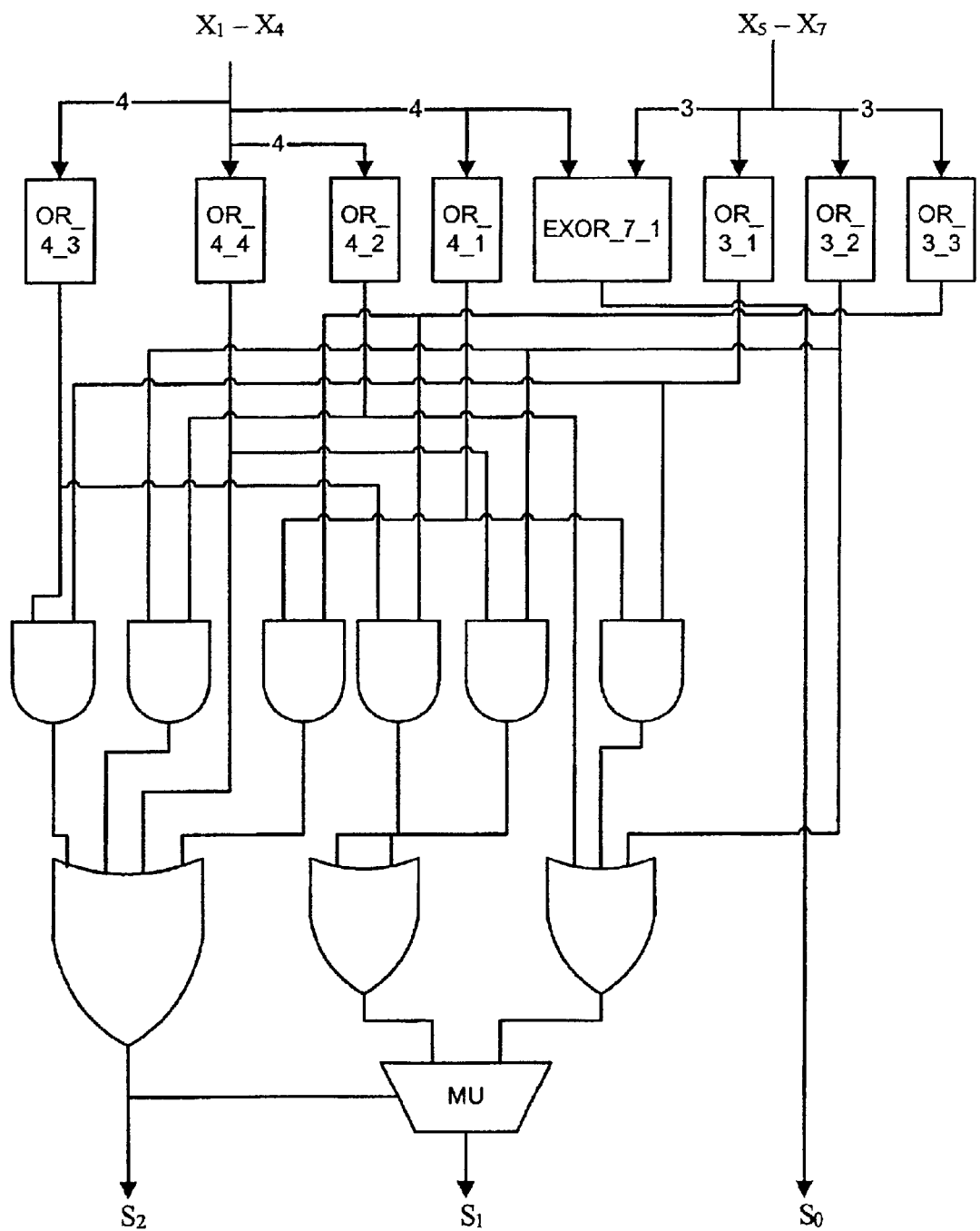
FIG. 13 is a another diagram of a parallel counter similar to that of FIG. 12 accept that the partitioning of the inputs is chosen differently to use different functional sub modules according to one embodiment of the present invention.

$OR\_7\_2(X_1, \ldots, X_7) = OR\_4\_2(X_1, X_2, X_3, X_4) \vee$ $(OR\_4\_1(X_1, X_2, X_3, X_4) \wedge OR\_3\_1(X_5, X_6, X_7)) \vee$ $OR\_3\_2(X_5, X_6, X_7)$ $OR\_7\_4(X_1, \ldots, X_7) = OR\_4\_4(X_1, X_2, X_3, X_4) \vee$ $(OR\_4\_3(X_1, X_2, X_3, X_4) \wedge OR\_3\_1(X_5, X_6, X_7)) \vee$ $(OR\_4\_2(X_1, X_2, X_3, X_4) \wedge OR\_3\_2(X_5, X_6, X_7)) \vee$ $(OR\_4\_1(X_1, X_2, X_3, X_4) \wedge OR\_3\_3(X_5, X_6, X_7)),$ $OR\_7\_6(X_1, \ldots, X_7) =$ $(OR\_4\_4(X_1, X_2, X_3, X_4) \wedge OR\_3\_2(X_5, X_6, X_7)) \vee$ $(OR\_4\_3(X_1, X_2, X_3, X_4) \wedge OR\_3\_3(X_5, X_6, X_7)).$ One needs a method to choose between the implementations in FIGS. 12 and 13. Here is a pneumonic rule for making a choice. If one or two inputs arrive essentially later then one should use the implementation on FIG. 12 based on partition 7=5+2. Otherwise, the implementation on FIG. 13 based on partition 7=4+3 is probably optimal.

Parallel counters with 6, 5, and 4 inputs can be implemented according to the logic for the seven input parallel counter. Reducing the number of inputs decreases the area significantly and increases the speed slightly. It is advantageous to implement a six input parallel counter using partitions of 6, 3+3 or 4+2.

A preferred embodiment of the present invention will now be described with reference to FIGS. 14 to 21.

Although it is possible to implement any OR_n_k or EXOR_n_k function in two levels of logic, the fan-out of each input is very high and the fan-in of the OR gate is also very high. It is known that both high fan-out and high fan-in contribute significantly to the delay of the circuit. It is often required that more than one OR_n_k or EXOR_n_k function be computed from the same inputs. A two level implementation does not allow sharing of logic thus resulting in high area.

Figure 14:
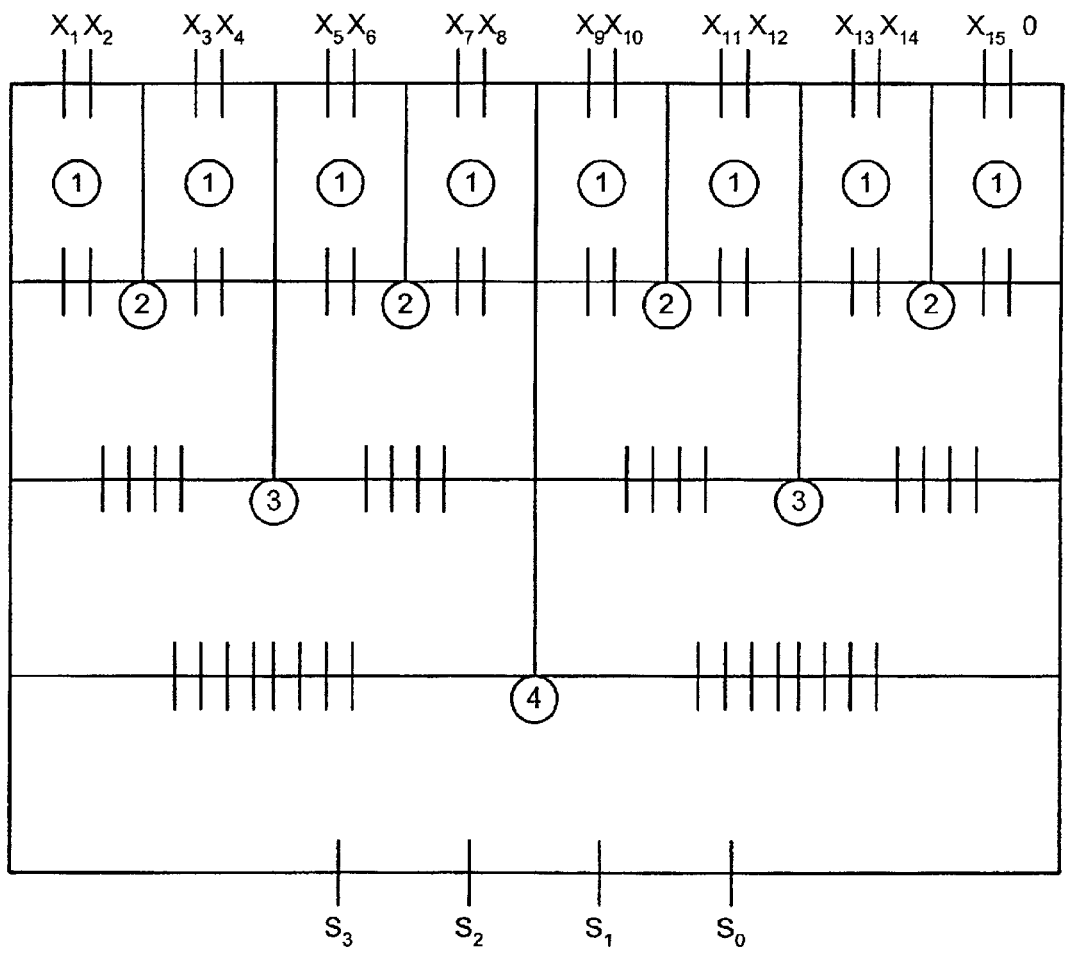
FIG. 14 is a diagram schematically illustrating the binary tree organisation of the logic in a parallel counter according to a second aspect of the invention.

This embodiment of the present invention uses the binary tree splitting of the inputs and the logic to reduce fan-out and enable reuse of logic. FIG. 14 illustrates schematically the organisation of the logic. At a first level 8 elementary logic blocks 1 are used each having two of the binary inputs and providing 2 outputs. The elementary logic blocks 1 of the first level perform elementary symmetric functions. These can either be exclusive OR symmetric functions or OR symmetric functions. At the second level four secondary logic blocks 2 each use the logic of two elementary logic blocks 1 and hence have four inputs and four outputs. The secondary logic blocks 2 perform larger symmetric functions. At the third level two tertiary logic blocks 3 each use the logic of two secondary logic blocks 2 and hence have eight inputs and eight outputs. The tertiary logic blocks 3 perform larger symmetric functions. At the fourth level the parallel counter 4 uses the logic of two tertiary logic blocks 3 and hence has sixteen inputs and sixteen outputs.

As can be seen in FIG. 14, the binary tree arrangement of the logic enables the logic for performing smaller symmetric functions to be used for the parallel counter. Also the arrangement provides for significant logic sharing. This significantly reduces fan-out.

As will be described in more detail, it is also possible to provide further logic sharing by using the elementary symmetric function logic for combining outputs of previous logic blocks in the binary tree.

The functions OR_16_8, OR_16_4 and OR_16_12 are constructed from the set of inputs $X_1, X_2 \ldots X_{16}$. Although, the embodiment is described with OR_n_k functions the same construction applies to EXOR_n_k functions after replacing every OR gate by an EXOR gate.

Figure 15:
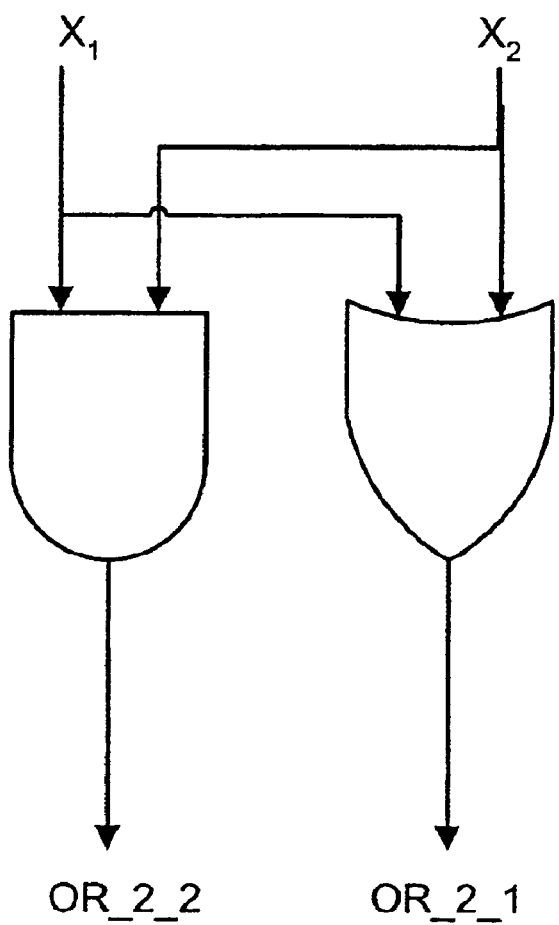
FIG. 15 is a diagram illustrating the logic block (Block 1) for implementing the elementary symmetric functions OR_2_2 and OR_2_1 according to one embodiment of the present invention.

The principles behind this embodiment of the invention will now be described. The function OR_(r+s)_t can be computed as the OR of the functions OR_r_k^OR_s_t-k as t runs through 0, 1, 2 . . . k, $OR(r+s)\_t(X_1 \ldots X_{r+1}) = \vee_{k=0}[OR\_r\_k(X_1 \ldots X_r) \hat{} OR\_s\_(t-k)(X_{r+1} \ldots X_{r+s})].$ In an embodiment with 16 inputs, at a first level the 16 inputs are divided into 8 subsets—$\{X_1,X_2\}, \{X_3,X_4\}, \ldots, \{X_{15},X_{16}\}$, each subset containing two inputs. For each subset a logic block 1 that computes OR_2_1 and OR_2_2 is constructed. The 8 blocks form the first level of the tree. Since each input fans out into an OR gate and an AND gate we see that each input has a fan-out of two. Also the first layer is very regular consisting of 8 identical blocks. The logic block 1 for computing the symmetric functions OR_2_1 and OR_2_2 is illustrated in FIG. 15.

Figure 16:
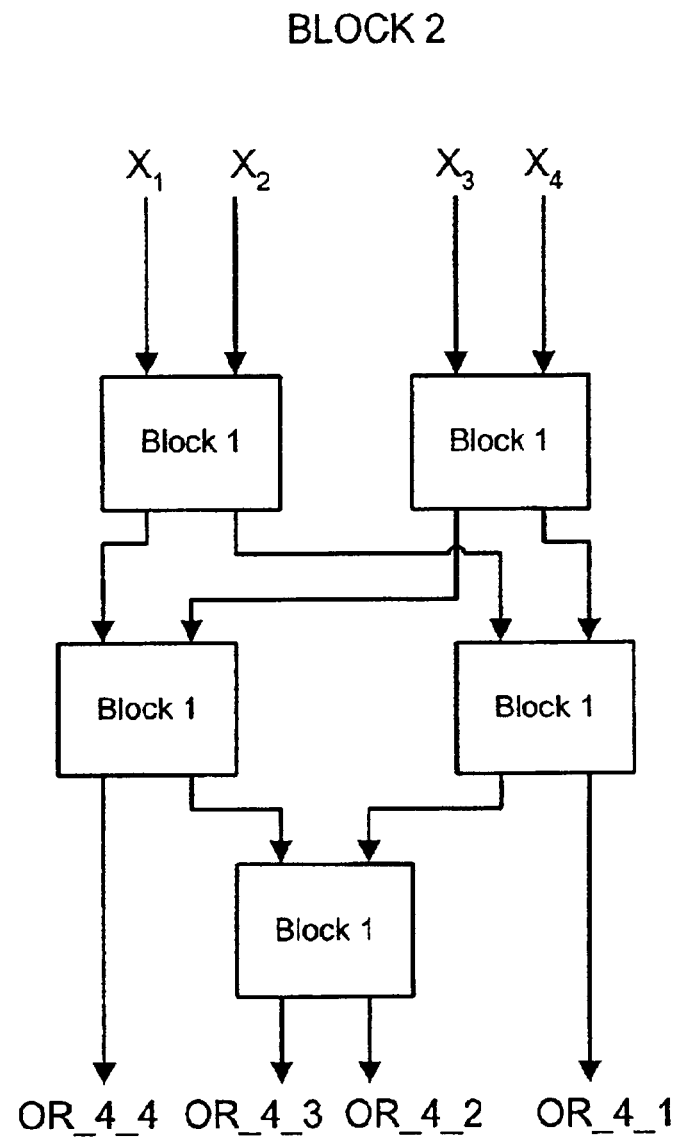
FIG. 16 is a diagram illustrating the logic block (Block 2) for implementing the secondary symmetric functions OR_4_4, OR_4_3, OR_4_2 and OR_4_1 according to one embodiment of the present invention.
Figure 17:
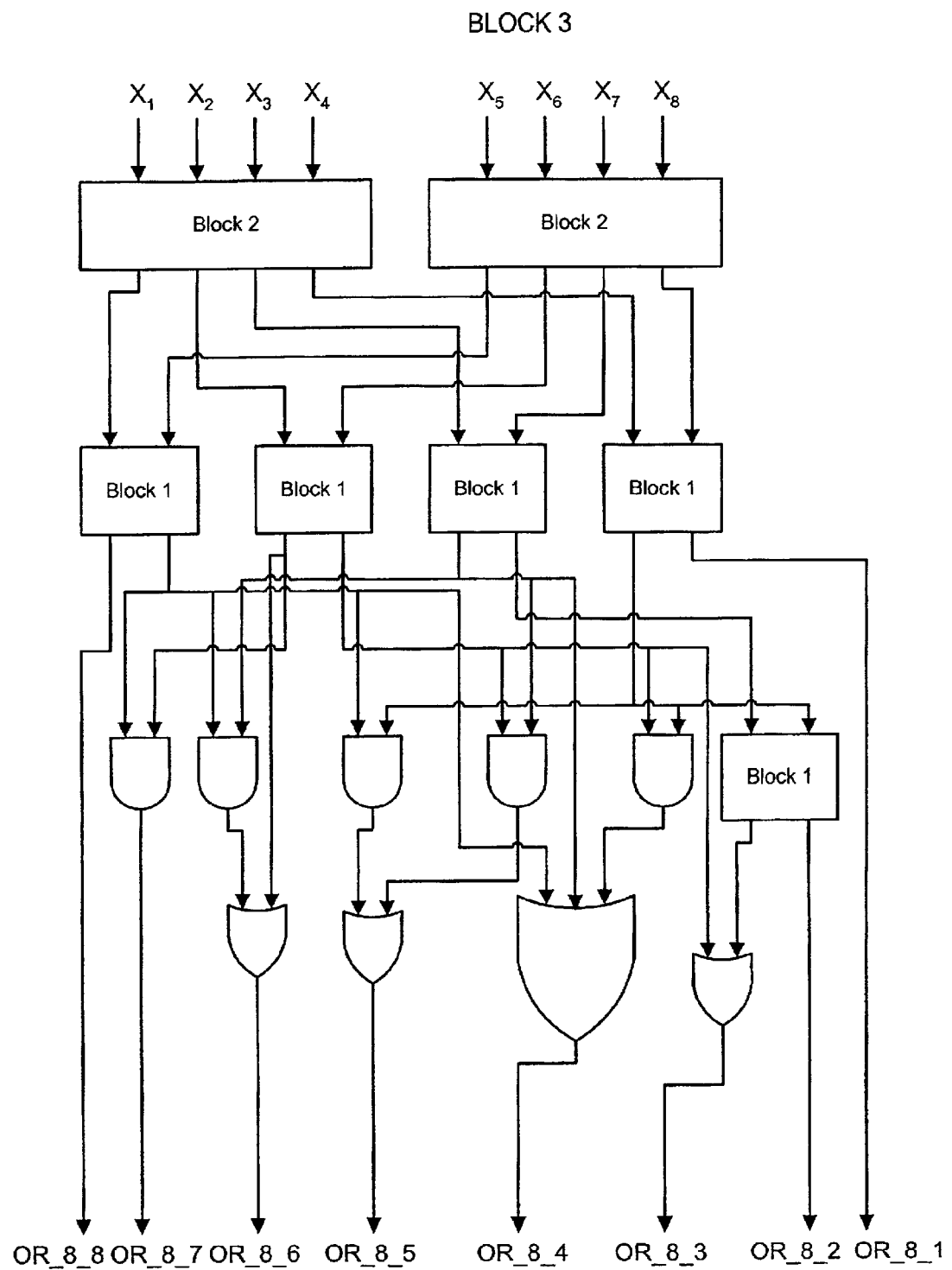
FIG. 17 is a diagram illustrating the logic block (Block 3) for implementing the tertiary symmetric functions OR_8_8, OR_8_7, OR_8_6, OR_8_5, OR_8_4, OR_8_3, OR_8_2 and OR_8_1 according to one embodiment of the present invention.

At a second level, 4 logic blocks 2 are formed by combining outputs from two adjacent logic blocks 1 at level one. These 4 blocks comprise the second layer of the tree. Each block has as inputs the outputs of two adjacent blocks from level one. The inputs are combined to form the functions OR_4_1, OR_4_2, OR_4_3, OR_4_4. The logic block 2 for computing these symmetric functions is illustrated in FIG. 16. The indices 1 and 2 are used in the equations below to distinguish functions formed on different subsets of the set of inputs. The symmetric functions can be represented as:

$OR\_4\_1 = [OR\_2\_1]_1 \vee [OR\_2\_1]_2,$ $OR\_4\_2 = ([OR\_2\_1]_1 \hat{} [OR\_2\_1]_2) \vee ([OR\_2\_2]_1 + [OR\_2\_2]_2),$ $OR\_4\_3 = ([OR\_2\_1]_1 \hat{} [OR\_2\_2]_2) \vee ([OR\_2\_2]_1 \hat{} [OR\_2\_1]_2),$ $OR\_4\_4 = [OR\_2\_2]_1 \hat{} [OR\_2\_2]_2.$ At a third level, 2 logic blocks 3 are formed by combining outputs from two adjacent logic blocks 2 at level two. These 2 blocks comprise the third layer of the tree. Each block has as inputs the outputs of two adjacent blocks from level two. The inputs are combined to form the functions OR_8_1, OR_8_2, OR_8_3, OR_8_4, OR_8_5, OR_8_6, OR_8_7 and OR_8_8. The logic block 3 for computing these symmetric functions is illustrated in FIG. 17. The symmetric functions can be represented as:

$OR\_8\_1 = [OR\_4\_1]_1 \vee [OR\_4\_1]_2,$ $OR\_8\_2 = ([OR\_4\_1]_1 \hat{} [OR\_4\_1]_2) \vee [OR\_4\_2]_1 \vee [OR\_4\_2]_2,$ $OR\_8\_3 = ([OR\_4\_1]_1 \hat{} [OR\_4\_2]_2) \vee$ $([OR\_4\_2]_1 \hat{} [OR\_4\_1]_2) \vee [OR\_4\_3]_1 \vee [OR\_4\_3]_2,$ $OR\_8\_4 = ([OR\_4\_1]_1 \hat{} [OR\_4\_3]_2) \vee ([OR\_4\_2]_1 \hat{} [OR\_4\_2]_2) \vee$ $([OR\_4\_3]_1 \hat{} [OR\_4\_1]_2) \vee [OR\_4\_4]_1 \vee [OR\_4\_4]_2,$ $OR\_8\_5 = ([OR\_4\_1]_1 \hat{} [OR\_4\_4]_2) \vee ([OR\_4\_2]_1 \hat{} [OR\_4\_3]_2) \vee$ $([OR\_4\_3]_1 \hat{} [OR\_4\_2]_2) \vee ([OR\_4\_4]_1 \hat{} [OR\_4\_1]_2),$ $$OR\_8\_6=([OR\_4\_2]_1 \uparrow OR\_4\_4]_2) \vee$$
$$([OR\_4\_3]_1 \uparrow OR\_4\_3]_2) \vee ([OR\_4\_4]_1 \uparrow OR\_4\_2]_2),$$
$$OR\_8\_7=([OR\_4\_3]_1 \uparrow OR\_4\_4]_2) \vee ([OR\_4\_4]_1 \uparrow OR\_4\_3]_2),$$
$$OR\_8\_8=[OR\_4\_4]_1 \uparrow [OR\_4\_4]_2.$$

Figure 18:
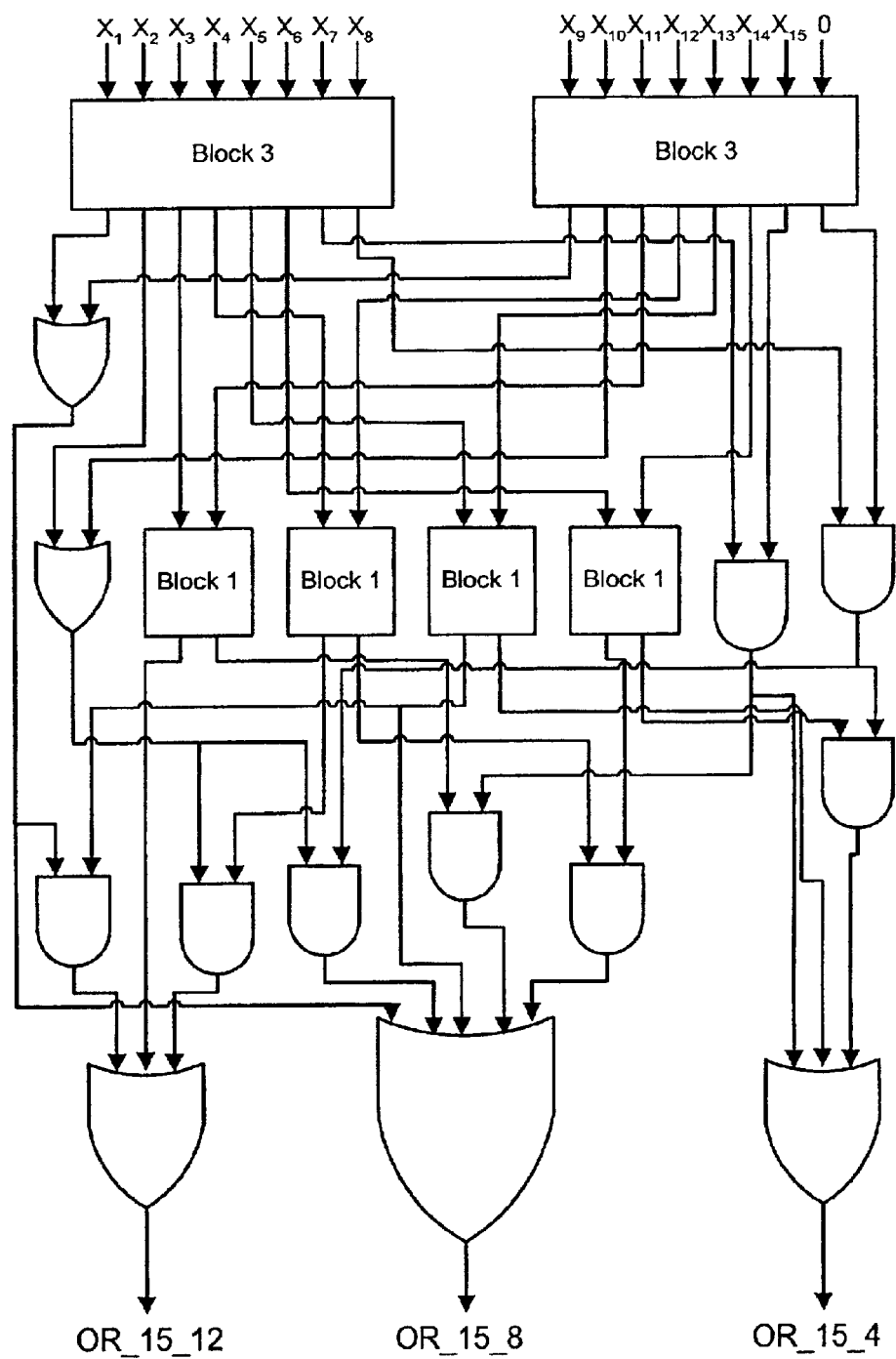
FIG. 18 is a diagram illustrating the logic block (Block 4) for implementing the symmetric functions OR_15_12, OR_15_8 and OR_15_4 according to one embodiment of the present invention.

At the final level, 3 outputs are formed by combining outputs from the two adjacent logic blocks 3 at level 3. This logic comprises the third layer of the tree. Outputs of the two adjacent blocks from level three are combined to form the functions OR_16_8, OR_16_4, and OR_16_12. The logic block 4 for computing these symmetric functions is illustrated in FIG. 18. The symmetric functions can be represented as:

$$OR\_16\_4=([OR\_8\_1]_1 \uparrow OR\_8\_3]_2) \vee ([OR\_8\_2]_1 \uparrow OR\_8\_2]_2) \vee$$
$$([OR\_8\_3]_1 \uparrow OR\_8\_1]_2) \vee [OR\_8\_4]_1 \uparrow OR\_8\_4]_2,$$

$$OR\_16\_8=([OR\_8\_1]_1 \uparrow OR\_8\_7]_2) \vee ([OR\_8\_2]_1 \uparrow OR\_8\_6]_2) \vee$$
$$([OR\_8\_3]_1 \uparrow OR\_8\_5]_2) \vee ([OR\_8\_4]_1 \uparrow OR\_8\_4]_2) \vee ([OR\_8\_5]_1 \uparrow OR\_8\_3]_2) \vee$$
$$([OR\_8\_6]_1 \uparrow OR\_8\_2]_2) \vee ([OR\_8\_7]_1 \uparrow OR\_8\_1]_2) \vee [OR\_8\_8]_1 \uparrow OR\_8\_8]_2,$$

$$OR\_16\_12=([OR\_8\_4]_1 \uparrow OR\_8\_8]_2) \vee ([OR\_8\_5]_1 \uparrow OR\_8\_7]_2) \vee$$
$$([OR\_8\_6]_1 \uparrow OR\_8\_6]_2) \vee ([OR\_8\_7]_1 \uparrow OR\_8\_5]_2) \vee ([OR\_8\_8]_1 \uparrow OR\_8\_4]_2).$$

Figure 19:
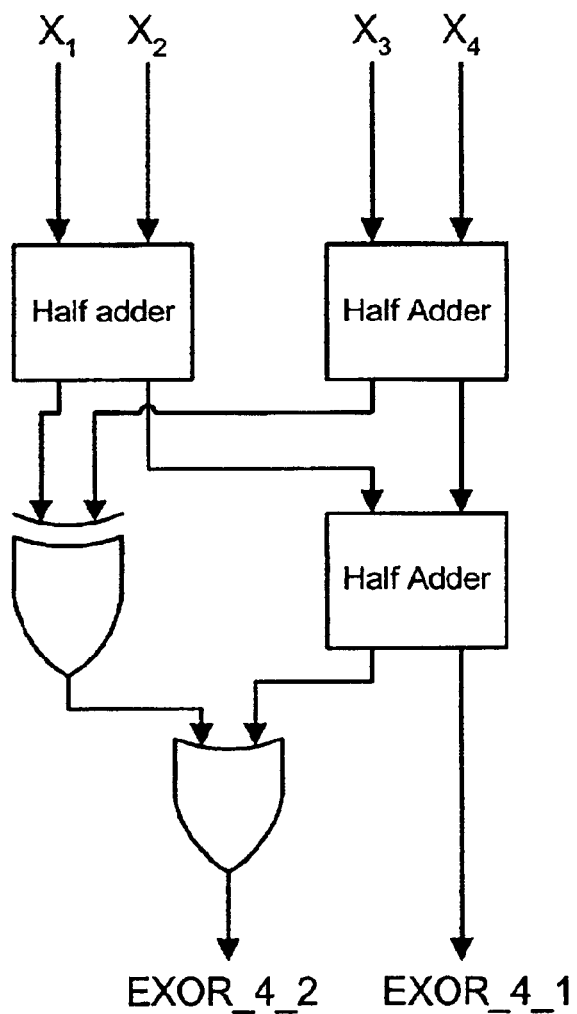
FIG. 19 is a diagram illustrating the logic block (Block 5) for implementing the elementary symmetric functions EXOR_4_2 and OR_4_1 according to one embodiment of the present invention.
Figure 20:
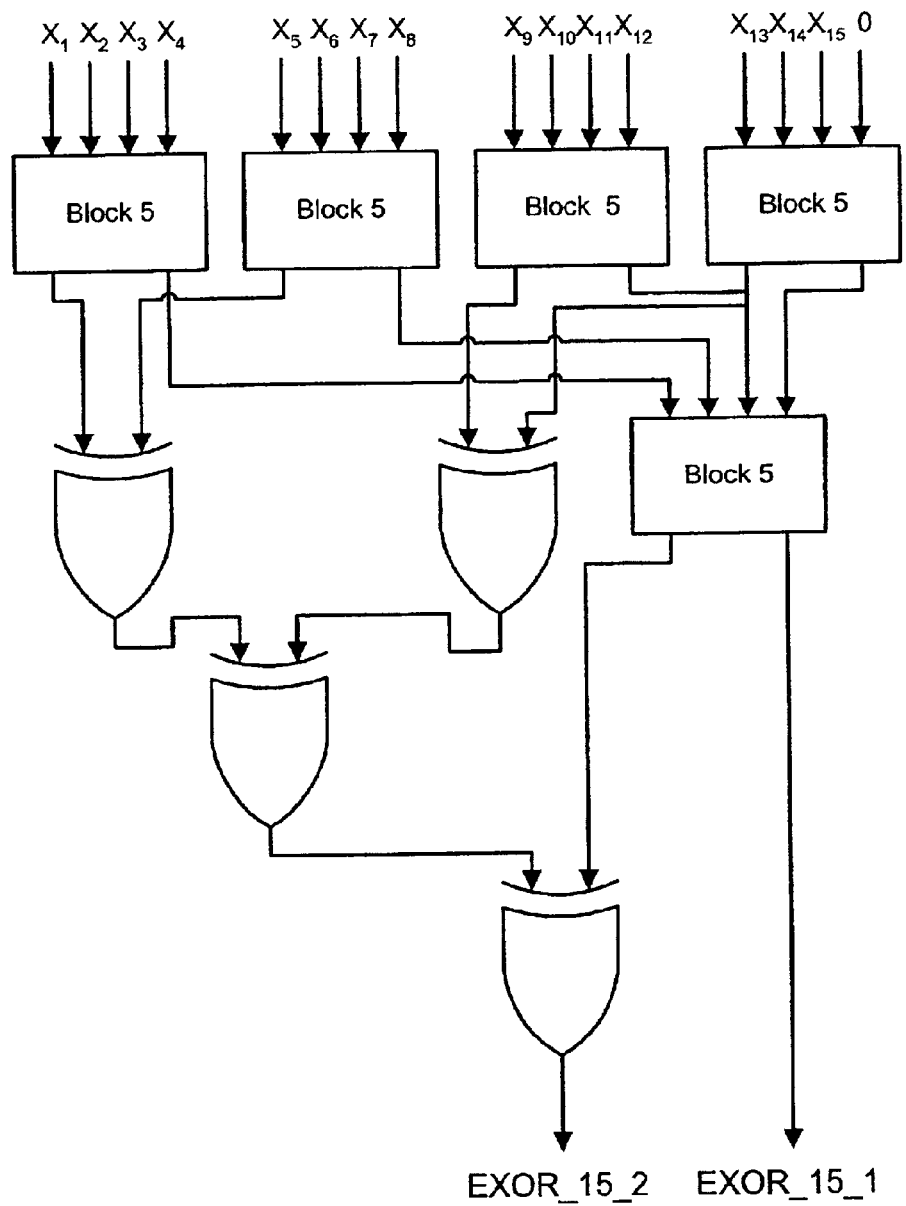
FIG. 20 is a diagram illustrating the logic block (Block 6) for implementing the elementary symmetric functions EXOR_15_2 and OR_15_1 according to one embodiment of the present invention.

Whilst it is possible in accordance with the invention to generate all of the outputs of the parallel counter using the outputs of the logic blocks 3, it is advantageous to determine the two least significant bits separately in parallel. This is illustrated in FIGS. 19 and 20. Although this increases fan-out slightly, it decreases the depth of the tree thus increases the speed of the circuit.

FIG. 19 is a diagram of a logic block 5 for determining the symmetric functions EXOR_4_2 and EXOR_4_1. In the determination of EXOR_4_2 the faster OR gate replaces an EXOR gate, according to:

$$EXOR\_4\_2=([OR\_2\_1]_1 \uparrow OR\_2\_1]_2) \oplus [OR\_2\_2]_1 \oplus [OR\_2\_2]_2 =$$
$$=([OR\_2\_1]_1 \uparrow OR\_2\_1]_2) \vee ([OR\_2\_2]_1 \oplus [OR\_2\_2]_2).$$

Four of these logic blocks 5 are provided to take the 16 inputs. Thus the logic block 5 can be considered to be a combined level 1 and 2 implementation.

In FIG. 19 the final logic gate is not and EXOR gate but an OR gate. This is because both of the inputs to the gate cannot be high at the same time i.e. AB=0 and thus the relationship A⊕B=A∨B holds. Thus in accordance with one aspect of the present invention, faster OR gates can be included in the design of a logic circuit by identifying situations where this relationship holds. This process can be performed automatically by a computer program during logic circuit design.

FIG. 20 is a diagram of a logic block 6 for determining the symmetric functions EXOR_15_2 and EXOR_15_1 which comprise the least two significant bits output from the parallel counter of this embodiment. This logic block comprises level 3 in the binary tree and it uses four of the logic blocks 5. Thus even in this parallel determination of the least significant two bits, there is reuse of logic using the binary tree structure.

Figure 21:
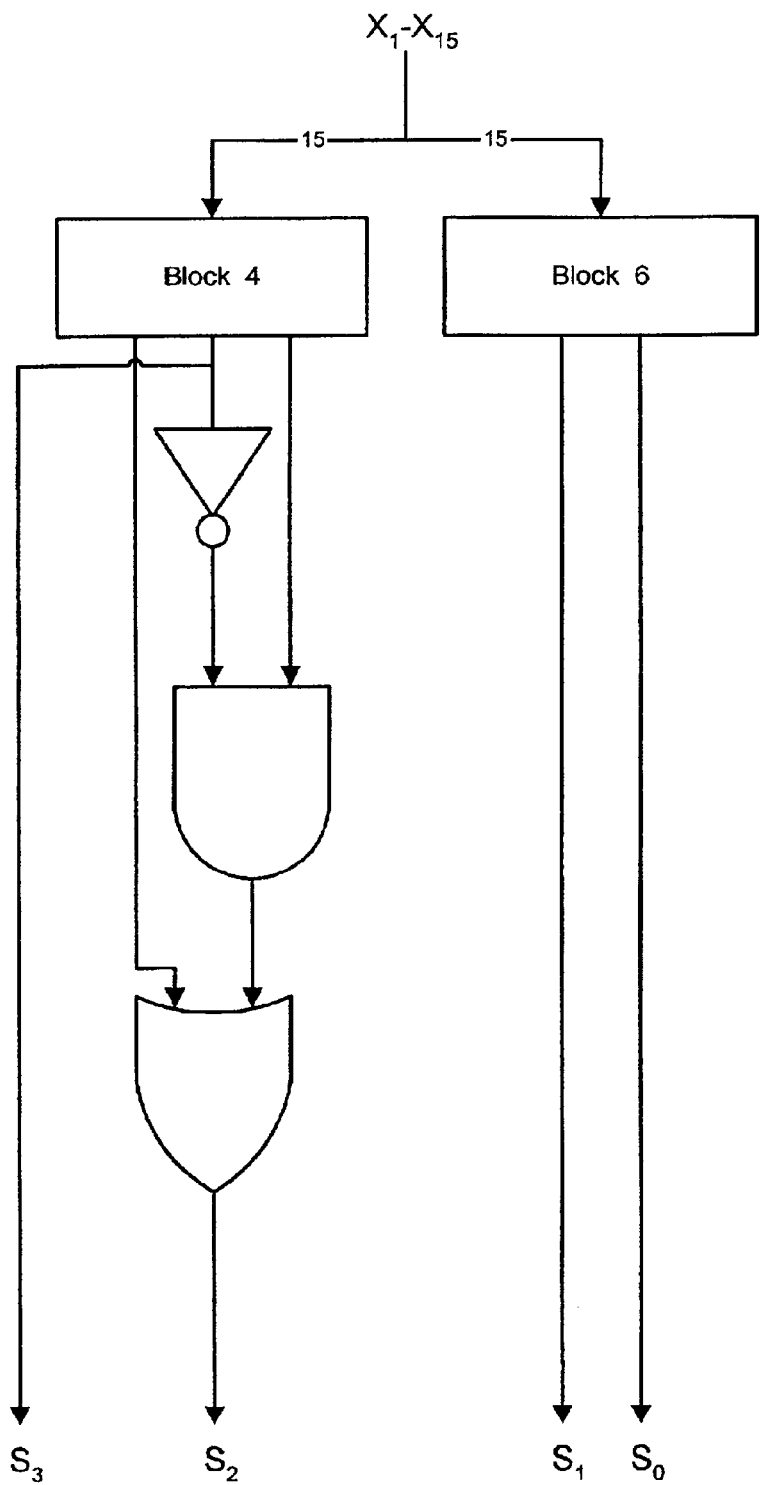
FIG. 21 is a diagram schematically illustrating a parallel counter using the logic blocks of FIGS. 15 to 20 according to one embodiment of the present invention.

FIG. 21 is a diagram of the parallel counter of this embodiment of the invention in which the logic of block 4 is used to determine the most significant bits and the logic of block 6 is used to determine the least significant bits.

In the logic blocks illustrated in FIGS. 16, 17 and 18, it can be seen that in addition to sharing logic for the inputs, the outputs of the elementary logic blocks, the secondary logic blocks and the tertiary logic blocks are input into elementary logic blocks thus providing further logic sharing. The reason for this is that OR functions are not independent. Assuming that $k \geq s$, $$OR\_n\_k \wedge OR\_n\_s = OR\_n\_k, \qquad 1$$

$$OR\_n\_k \vee OR\_n\_s = OR\_n\_s. \qquad 2$$

This shows that there are possible redundant AND and OR logical operations in the multiplexing operation for the outputs of logic performing small elementary symmetric functions to implement large elementary symmetric functions.

These formulas result in significant reductions in logic for parallel counter. The first instance of such a reduction is the following formula for the second most significant bit of a parallel counter, $$S_{t-1} = OR\_n\_(2^t + 2^{t-1}) \vee [\neg OR\_n\_2^t \wedge OR\_n\_2^{t-1}].$$

For example, in the circuit of FIG. 10, the multiplexor (MU) generates $S_1$ using OR(7,4), OR(7,6) and OR(7,2). In unreduced for the logic to generate $S_1$ is:

$$S_1 = [OR(7,4) \wedge OR(7,6)] \vee [\neg OR(7,4) \wedge OR(7,2)]$$

Using the equations 1 and 2 above, this reduces to:

$$S_1 = OR(7,6) \vee [\neg OR(7,4) \wedge OR(7,2)]$$

It can thus be seen that the function OR(7,4) is redundant in the determination of $S_1$.

In the circuit of FIG. 21, the multiplexing in performed by the three logic gates. In unreduced form the output $S_2$ would be:

$$S_2 = [OR(15,8) \wedge OR(15,12)] \vee [\neg OR(15,8) \wedge OR(15,4)]$$

Using the equations 1 and 2 given above, this reduces to:

$$S_2 = OR(15,12) \vee [\neg OR(15,8) \wedge OR(15,4)]$$

This is the logic illustrated in FIG. 21 comprising the three logic gates for combining the outputs of block 4 i.e. an inverter, an AND gate and an OR gate.

Thus this process of reduction can be implemented during the logic circuit design process to identify where the relationship given in equations 1 and 2 hold thus enabling a reduction in logic to be implemented.

To show the second instance of such a reduction, it is assumed that $k \geq s$, $$([OR\_n\_k]_1 \wedge [OR\_m\_s]_2) \vee ([OR\_m\_s]_1 \wedge [OR\_n\_k]_2) =$$
$$[OR\_m\_s]_1 \wedge [OR\_m\_s]_2 \wedge ([OR\_n\_k]_1 \vee [OR\_n\_k]_2).$$

These formulas allow the reduction of fan-out by sharing certain logic. As shown on block 2, the functions OR_4_2 and OR_4_3 are implemented by three levels of shared logic, $$OR\_4\_1 = [OR\_2\_1]_1 \vee [OR\_2\_1]_2,$$
$$OR\_4\_2 = ([OR\_2\_1]_1 \wedge [OR\_2\_1]_2) \vee [OR\_2\_2]_1 \vee [OR\_2\_2]_2,$$

$OR\_4\_3 = [OR\_2\_1]_1 \wedge [OR\_2\_1]_2 \wedge ([OR\_2\_2]_1 \vee [OR\_2\_2]_2),$ $OR\_4\_4 = [OR\_2\_2]_1 \cdot [OR\_2\_2]_2.$ Block 3 is a circuit implementing logic of level three. The reductions afford the following expressions for functions OR_8_1, OR_8_2, OR_8_3, OR_8_4, OR_8_5, OR_8_6, OR_8_7, and OR_8_8, $OR\_8\_1 = [OR\_4\_1]_1 \vee [OR\_4\_1]_2,$ $OR\_8\_2 = ([OR\_4\_1]_1 \uparrow OR\_4\_1]_2) \vee ([OR\_4\_2]_1 \vee [OR\_4\_2]_2),$ $OR\_8\_3 = [([OR\_4\_1]_1 \uparrow OR\_4\_1]_2)\hat{\ }$ $([OR\_4\_2]_1 \vee [OR\_4\_2]_2)] \vee [OR\_4\_3]_1 \vee [OR\_4\_3]_2,$ $OR\_8\_4 = [([OR\_4\_1]_1 \uparrow OR\_4\_1]_2)\hat{\ }([OR\_4\_3]_1 \vee [OR\_4\_3]_2)] \vee$ $([OR\_4\_2]_1 \uparrow OR\_4\_2]_2) \vee [OR\_4\_4]_1 \vee [OR\_4\_4]_2,$ $OR\_8\_5 = [([OR\_4\_1]_1 \uparrow OR\_4\_1]_2)\hat{\ }([OR\_4\_4]_1 \vee [OR\_4\_4]_2)] \vee$ $[([OR\_4\_2]_1 \uparrow OR\_4\_2]_2)\hat{\ }([OR\_4\_3]_1 \vee [OR\_4\_3]_2)],$ $OR\_8\_6 = [([OR\_4\_2]_1 \uparrow OR\_4\_2]_2)\hat{\ }([OR\_4\_4]_1 \vee [OR\_4\_4]_2)] \vee$ $([OR\_4\_3]_1 \uparrow OR\_4\_3]_2),$ $OR\_8\_7 = ([OR\_4\_3]_1 \uparrow OR\_4\_3]_2)\hat{\ }$ $([OR\_4\_4]_1 \vee [OR\_4\_4]_2),$ $OR\_8\_8 = [OR\_4\_4]_1 \cdot [OR\_4\_4]_2.$ Block 4 is a circuit implementing logic for level 4. The implementation of functions OR_16_8, OR_16_4, and OR_16_12 follows reduced formulas, $OR\_16\_4 = [([OR\_8\_1]_1 \uparrow OR\_8\_1]_2)\hat{\ }([OR\_8\_3]_1 \vee [OR\_8\_3]_2)] \vee$ $([OR\_8\_2]_1 \uparrow OR\_8\_2]_2) \vee [OR\_8\_4]_1 \vee [OR\_8\_4]_2,$ $OR\_16\_8 = [([OR\_8\_1]_1 \uparrow OR\_8\_1]_2)\hat{\ }([OR\_8\_7]_1 \vee [OR\_8\_7]_2)] \vee$ $[([OR\_8\_2]_1 \uparrow OR\_8\_2]_2)\hat{\ }([OR\_8\_6]_1 \vee [OR\_8\_6]_2)] \vee$ $[([OR\_8\_3]_1 \uparrow OR\_8\_3]_2)\hat{\ }([OR\_8\_5]_1 \vee [OR\_8\_5]_2)] \vee$ $([OR\_8\_4]_1 \uparrow OR\_8\_4]_2) \vee [OR\_8\_8]_1 \vee [OR\_8\_8]_2,$ $OR\_16\_12 = [([OR\_8\_4]_1 \uparrow OR\_8\_4]_2)\hat{\ }([OR\_8\_8]_1 \vee [OR\_8\_8]_2)] \vee$ $[([OR\_8\_6]_1 \uparrow OR\_8\_6]_2) \vee [([OR\_8\_5]_1 \uparrow OR\_8\_5]_2)\hat{\ }([OR\_8\_7]_1 \vee [OR\_8\_7]_2)].$ The binary tree principle of this embodiment of the present invention can be implemented using either OR or EXOR symmetric functions. When using EXOR symmetric functions there is a reduction in logic which applies. Assume that $k = \Sigma_{i \in S} 2^i$ where S is a set of natural numbers uniquely determined by k as a set of positions of ones in the binary representation of k. Then $EXOR\_n\_k = AND_{i \in S} EXOR\_n\_2^i.$ Thus, designing a circuit computing EXOR_n_k, one gets away with computing only functions EXOR_n_$2^i$ on subsets and thus although EXOR logic is slower, there is less fan-out than when using OR logic.

As can be seen in FIG. 21, the most efficient circuit can comprise a mixture of OR and EXOR symmetric function logic circuits.

Further reductions can be applied to logic for a parallel counter based on OR elementary symmetric functions. For instance, the third significant bit admits the expression $S_{t-2} = OR\_n\_(2^t + 2^{t-1} + 2^{t-2}) \vee [\neg OR\_n\_(2^t + 2^{t-1}) \wedge OR\_n\_(2^t + 2^{t-2})] \vee$ $[\neg OR\_n\_2^t \wedge OR\_n\_(2^{t-1} + 2^{t-2})] \vee [\neg OR\_n\_2^{t-1} \wedge OR\_n\_2^{t-2}].$ The reduction can be stated more generally using the expression:

$S_k = \{OR\_n\_2^k \wedge \neg OR\_n\_2^{k+1}\} \vee \{OR\_n\_2^{k+1} + 2^k \wedge \neg OR\_n\_2^{k+2}\}$ $\vee \{OR\_n\_2^{k+2} + 2^k \wedge \neg OR\_n\_2^{k+2} + 2^{k+1}\} \vee OR\_n\_2^t + 2^{t-1} + 2^{t-2} + 2^k$ where $S_k$ is the $k^{th}$ binary output, k=0 to t−1 and t is the number of outputs.

The generation of an output bit below the most significant bit can be explained as at least one AND combination of the output of one symmetric function with an inverted output of another symmetric function and OR combining the result of the AND combinations.

Another important application of reductions is logic for a conditional parallel counter. A conditional parallel counter is a module with n inputs. Let Q be a subset of {0, 1 . . . n}. The subset determines a condition. The module produces the binary representation of the number of high inputs if this number of high inputs belongs to Q. If the number of high inputs does not belong to Q, the outputs can be any logical function. Such a module can replace a parallel counter if the number of high inputs is in Q.

A useful conditional parallel counter has Q={0, 1 . . . m} for some m≦n. Logic for such a counter can be obtained from logic for a parallel counter with m inputs by replacing every OR_m_k with OR_n_k. For instance, if Q={0, 1, 2, 3} then a conditional parallel counter has 2 outputs $S_1$, $S_0$ given by $S_1 = OR\_n\_2, S_0 = EXOR\_n\_1.$ Another instance of a conditional parallel counter has Q={0, 1, 2, 3, 4, 5}, $S_2 = OR\_n\_4, S_1 = \neg OR\_n\_4 \wedge OR\_n\_2, S_0 = EXOR\_n\_1.$ If the number of high inputs for one of these two counters does not belong to Q then the output is the binary representation of the greatest element of Q, i.e., 3=11 or 5=101.

Although the previously described embodiment comprises a binary tree hierarchical arrangement of logic units, the present invention is applicable to any hierarchical arrangement of logic units. The splitting of the inputs need not be on a binary basis and all inputs need not be input to logic units for performing small elementary symmetric functions.

Figure 22:
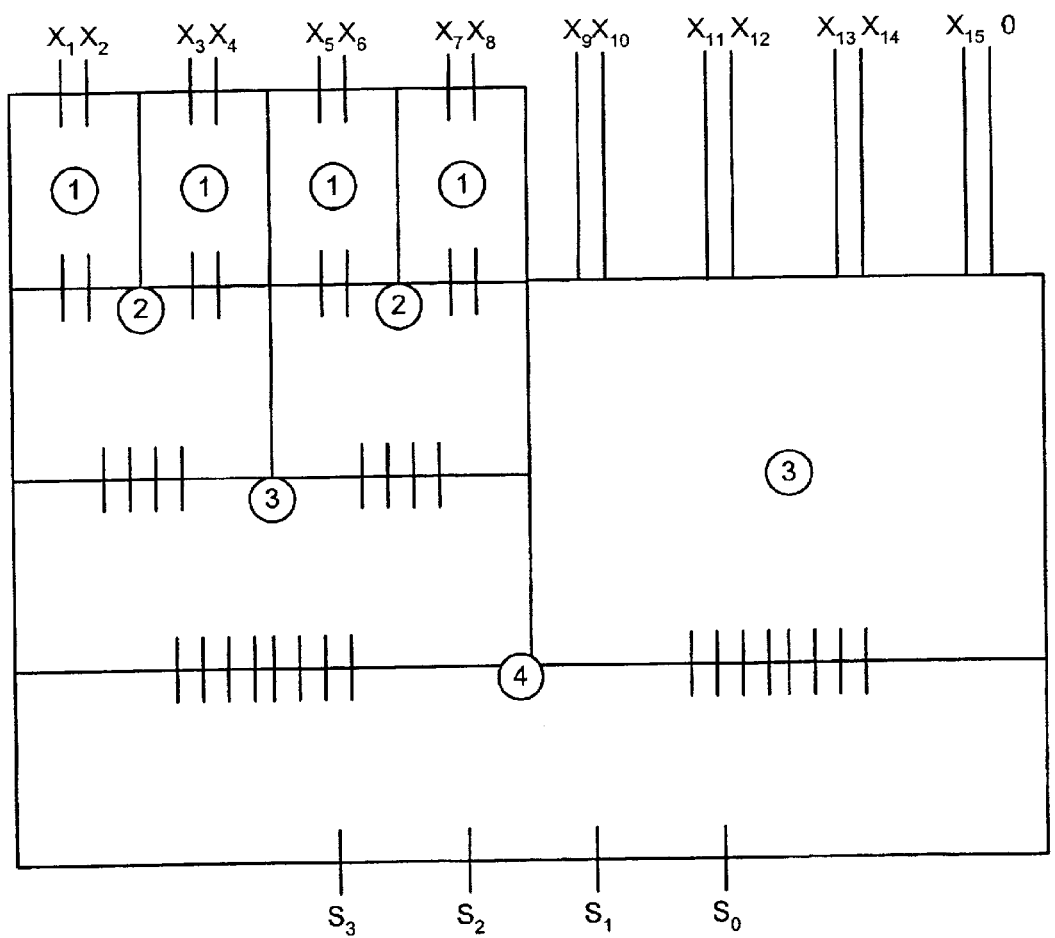
FIG. 22 is a diagram illustrating a hierarchical structure for logic units in accordance with an embodiment of the present invention.

For example, FIG. 22 illustrates a hierarchical arrangement in which only four of the inputs are input to elementary logic units. Four of the inputs are only input into a logic unit at the third level of the hierarchy. Each logic unit at each level of the hierarchy comprises the logic of logic units at preceding levels. In this example, the logic units at level 2 on the left comprise the logic of two logic units at the first level and the logic unit at level 3 on the left comprises two of the logic units at the second level. The logic unit at the third level on the right is not formed of sub units of logic in this embodiment. The logic unit at the fourth level comprises all of the logic units and comprises the logic circuit.

Figure 23:
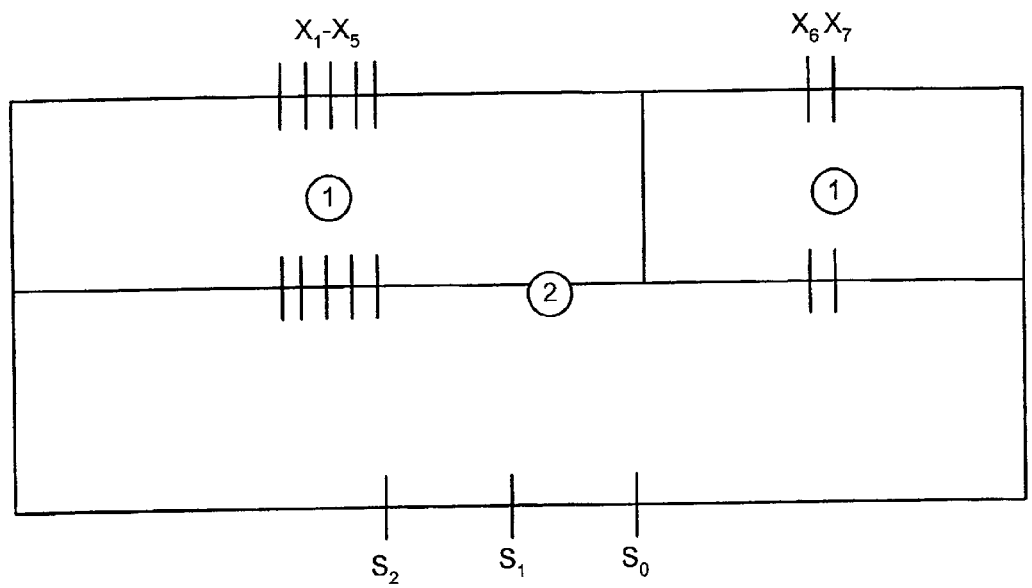
FIG. 23 is a diagram illustrating another hierarchical structure for logic units in accordance with an embodiment of the present invention.

FIG. 23 is another example illustrating the division of the logic circuit of FIG. 12 into two hierarchical levels. In this example, one logic unit at the first level has five inputs and the other has two. The logic unit having five inputs comprises the logic for performing the OR_5_1, OR_5_2, OR_5_3, OR_5_4 and OR_5_5 symmetric functions as can be seen in FIG. 12. The logic unit having two inputs comprises the logic for performing the EXOR_7_1 symmetric function as can be seen in FIG. 12. The logic unit at the second level comprises the logic units at the first level and comprises the complete logic circuit.

Figure 24:
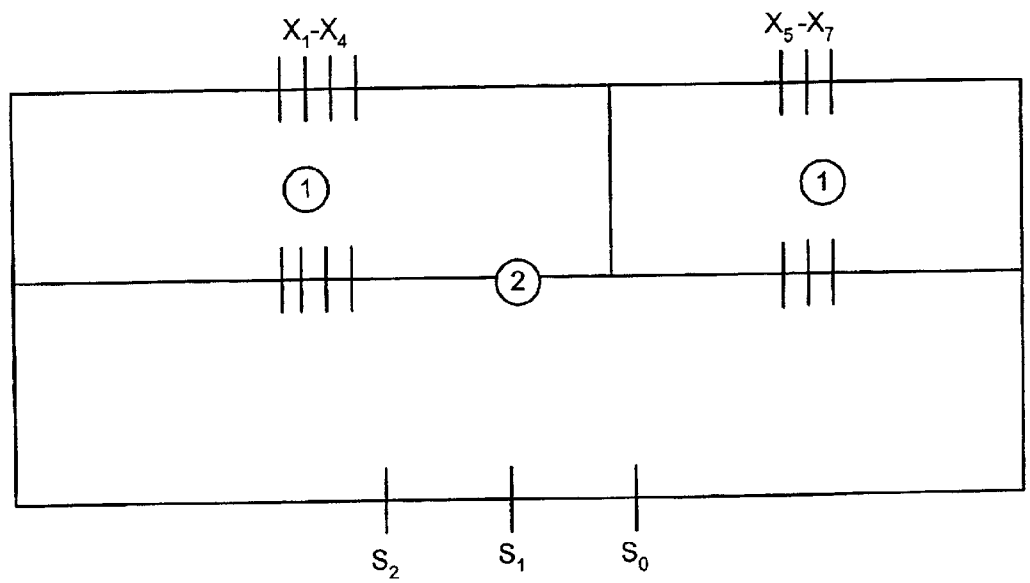
FIG. 24 is a diagram illustrating a further hierarchical structure for logic units in accordance with an embodiment of the present invention.

FIG. 24 is a further example illustrating the division of the logic circuit of FIG. 13 into two hierarchical levels. In this example, one logic unit at the first level has four inputs and the other has three. The logic unit having four inputs comprises the logic for performing the OR_4_1, OR_4_2, OR_4_3 and OR_4_4 symmetric functions as can be seen in FIG. 13. The logic unit having three inputs comprises the logic for performing the OR_3_1, OR_3_2 and OR_3_3 symmetric functions as can be seen in FIG. 13. The logic unit at the second level comprises the logic units at the first level and comprises the complete logic circuit.

During the design of the parallel counter it is possible to save logic by reusing fast logic units already available. There is a useful formula, $$OR\_n\_k(X_1 \ldots X_n) = \neg OR\_n\_(n+1-k)(\neg X_1 \ldots \neg X_n).$$

Thus if a library contains a fast module generating OR_4_3 then this module can be used with inverters to generate OR_4_2. The opposite observation holds as well: an OR_4_2 module enables the generation of OR_4_3.

An embodiment that implements a transistor economical and high-speed realisation of threshold functions will now be described with reference to FIGS. 25 to 28. In this embodiment the threshold functions are implemented as elementary symmetric functions.

It is generally known in electronics that AND-OR-INVERT gates are both economical in terms of the number of transistors to realize them and have good delay properties. Therefore this embodiment of the present invention utilises this to provide an economical and high-speed circuit design.

As described above, it is known that:

$$OR\_n\_k(X_1 \ldots X_n) = \neg OR\_n\_(n+1-k)(\neg X_1 \ldots \neg X_n) \quad (a)$$

This leads to:

$$\neg OR\_n\_k(X_1 \ldots X_n) = OR\_n\_(n+1-k)(\neg X_1 \ldots \neg X_n) \quad (b)$$

and $$OR\_n\_k(\neg X_1 \ldots \neg X_n) = OR\_n\_(n+1-k)(X_1 \ldots X_n) \quad (c)$$

To simplify notation, equation (a) can be written as:

$$[n,k] = [\underline{n,n+1-k}]'$$

Equation (b) can be written as:

$$[n,k]' = [\underline{n,n+1-k}]$$

Figure 25:
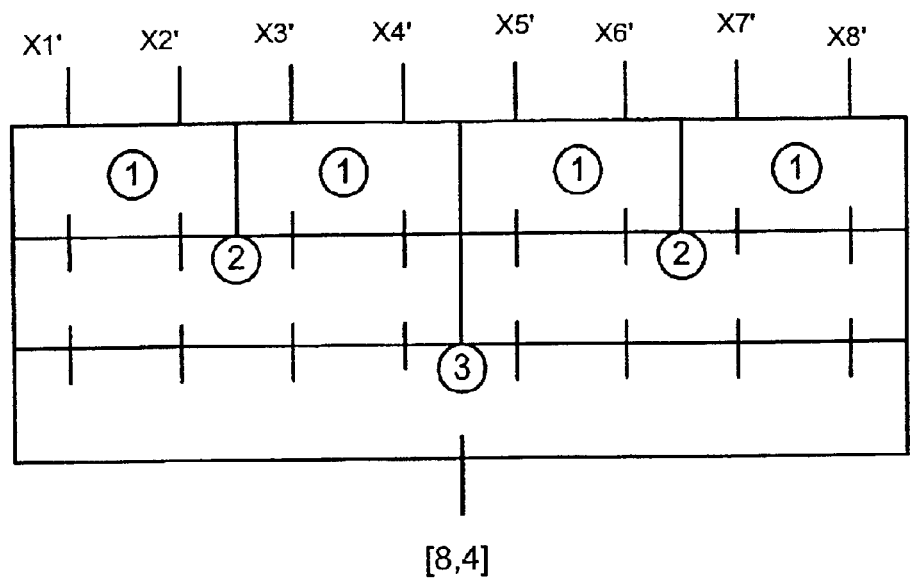
FIG. 25 is a diagram illustrating the hierarchical organisation of logic units in a tree structure to implement the elementary symmetric function OR_8_4 in accordance with an embodiment of the present invention.
Figure 26:
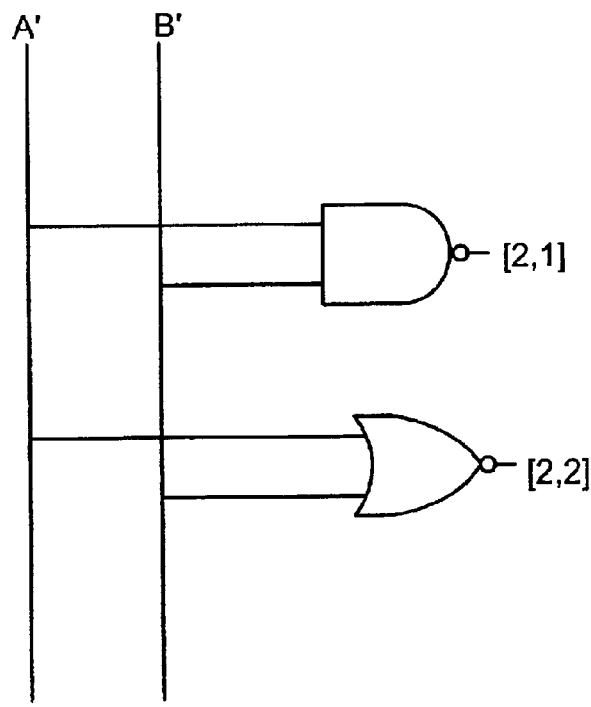
FIG. 26 is a diagram of the logic for a high speed implementation of the first level the circuit of FIG. 25.

Equation (c) can be written as:

$$[\underline{n,k}] = [n,n+1-k]'$$

where ' denotes an inversion of the outputs and denotes inverted inputs. Using these relationships, the circuit for the elementary symmetric function OR_8_4 [8,4] can be constructed in a similar manner to the embodiment described hereinabove with reference to FIG. 14. FIG. 25 illustrates the binary tree implementation of the elementary symmetric function OR_8_4 in which there are three levels of logic. The circuit receives inverted inputs X1' . . . X8'. The logic units in the first layer comprise a NAND gate and NOR-gate as shown in FIG. 26. If the inputs to this logic unit are A' and B', where ' denotes the inverse, the outputs of this block are [2,1]=(A'∧B')' and [2,2]=(A'∨B')' respectively. This logic circuit receives inverted inputs and implements an elementary symmetric function.

At the second level the outputs [2,1]a, [2,2]a, [2,1]b, [2,2]b from two consecutive first layer logic units are combined to derive the outputs [4,1], [4,2], [4,3] and [4,4]. To do this the following relationships are used:

$$[4,4]=[4,1]'=([2,1]a+[2,1]b)'$$

$$[4,3]=[4,2]'=([2,1]a[2,1]b+[2,2]a+[2,2]b)'$$

$$[4,2]=[4,3]'=([2,1]a[2,2]b+[2,2]a[2,1]b)'$$

$$[4,1]=[4,4]'=([2,2]a[2,2]b)'$$

Figure 27:
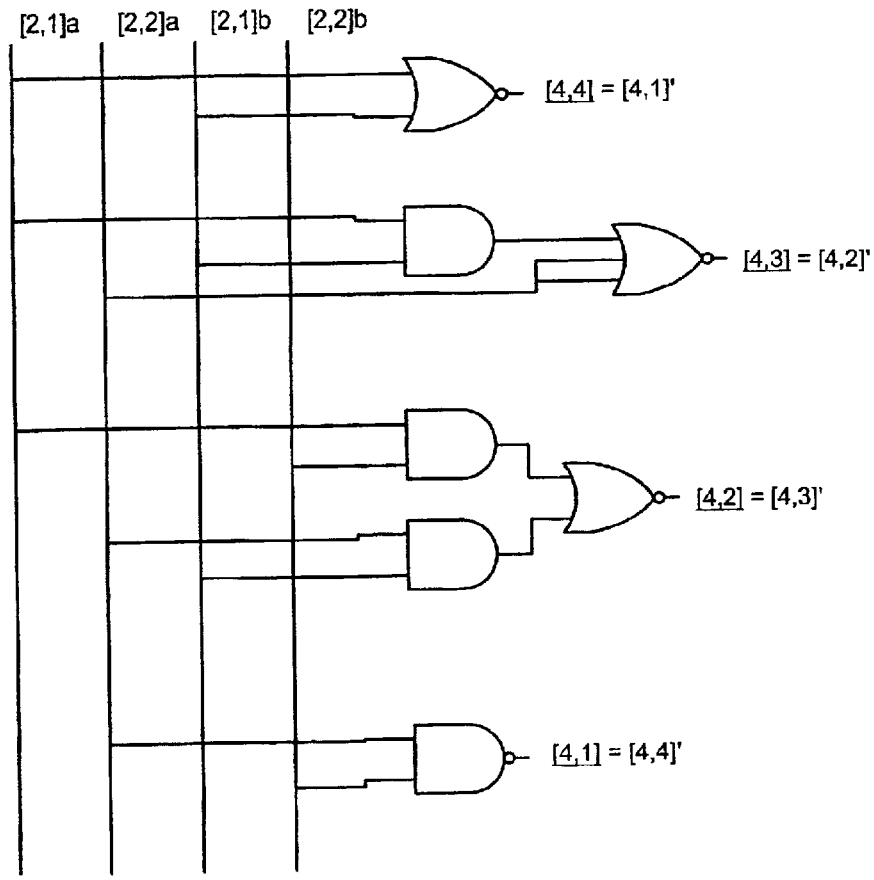
FIG. 27 is a diagram of the logic for a high speed implementation of the second level the circuit of FIG. 25.

The logic circuit realizing these logic equations is shown in FIG. 27. This logic circuit receives non inverted inputs and implements the inverted elementary symmetric function.

At the third level the outputs [4,1]a, [4,2]a, [4,3]a, [4,4]a, [4,1]b, [4,2]b, [4,3]b and [4,4]b from two consecutive second layer logic units are combined to derive the output [8,4].

The following relationship is used:

$$[8,4]=[8,5]'=[4,1]a[4,4]b+[4,2]a[4,3]b+[4,3]a[4,2]b+[4,4]a[4,1]b$$

Figure 28:
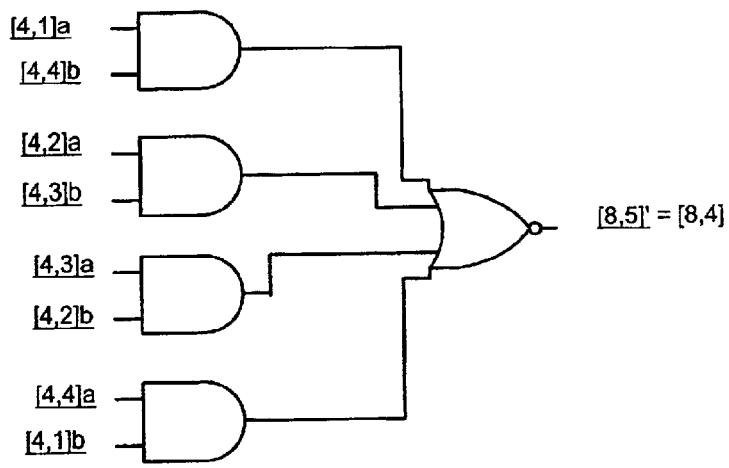
FIG. 28 is a diagram of the logic for a high speed implementation of the third level the circuit of FIG. 25.

The logic circuit realizing these logic equations is shown in FIG. 28. This logic circuit receives inverted inputs and implements an elementary symmetric function.

It can thus be seen from FIGS. 25 to 29 that symmetric functions and inverted symmetric functions are implemented at alternate levels of the hierarchical arrangement of logic units. If there are an odd number of levels, the inputs to the circuit must be inverted, as is the case for the illustrated example [8,4]. This use of inverted symmetric functions enables faster NAND gates to be used instead of AND gates (it should be noted that AND gates are implemented as a NAND gate with an inverter and thus the use of a NAND gate instead of an AND gate reduces the logic required to implement the function). The reduction of logic required also reduces the area of the logic circuit.

In this embodiment of the present invention, each level of the hierarchical logic structure includes inversion logic.

Although this technique has been illustrated with respect to the function [8,4], it will be apparent to a skilled person that the technique can be applied to any size function. Further, although this embodiment of the present invention has been implemented as a binary tree structure, the technique can be used for any hierarchical structure of logic units. Also, although in this embodiment of the present invention inverted inputs are used, if the number of levels of logic units in the hierarchy is even, the inputs need not be inverted. Instead inverted symmetric functions at an even number of levels can be used. Inverted inputs are required for circuits having an odd number of levels performing inverted symmetric functions.

An important application of conditional parallel counters is constant multipliers. A constant multiplier is a module whose inputs form binary representations of two numbers A, B, and outputs comprise the binary representation of the product A*B whenever A is a number that belongs to a set of allowed constants. Since constant multipliers are smaller and faster then multipliers, it is beneficial to use them whenever one can choose one multiplicand from the set of allowed constants. One can do it, for instance, designing a digital filter.

Another aspect of the present invention comprises a technique for multiplication and this will be described hereinafter.

Multiplication is a fundamental operation in digital circuits. Given two n-digit binary numbers $$A_{n-1}2^{n-1}+A_{n-2}2^{n-2}+ \ldots +A_1 2+A_0 \text{ and } B_{n-1}2^{n-1}+B_{n-2}2^{n-2}+ \ldots +B_1 2+B_0,$$

their product $$P_{2n-1}2^{2n-1}+P_{2n-2}2^{2n-2}+ \ldots +P_1 2+P_0$$

has up to 2n digits. Logical circuits generating all $P_i$ as outputs generally follow the scheme in FIG. 14. Wallace has invented the first fast architecture for a multiplier, now called the Wallace-tree multiplier (Wallace, C. S., *A Suggestion for a Fast Multiplier*, IEEE Trans. Electron. Comput. EC-13: 14–17 (1964)) (the content of which is hereby incorporated by reference). Dadda has investigated bit behaviour in a multiplier (L. Dadda, *Some Schemes for Parallel Multipliers*, Alta Freq 34: 349–356 (1965)) (the content of which is hereby incorporated by reference). He has constructed a variety of multipliers and most multipliers follow Dadda's scheme.

Figure 29:
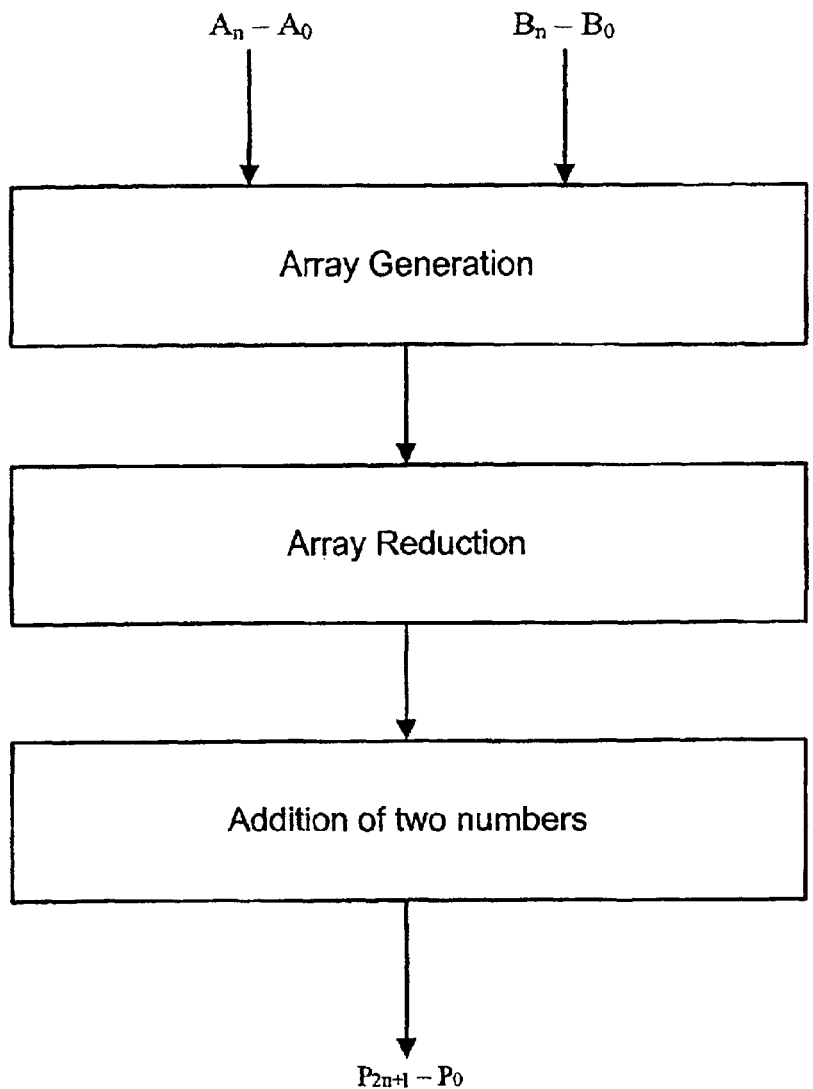
FIG. 29 is a diagram of the steps used in the prior art for multiplication.
Figure 30:
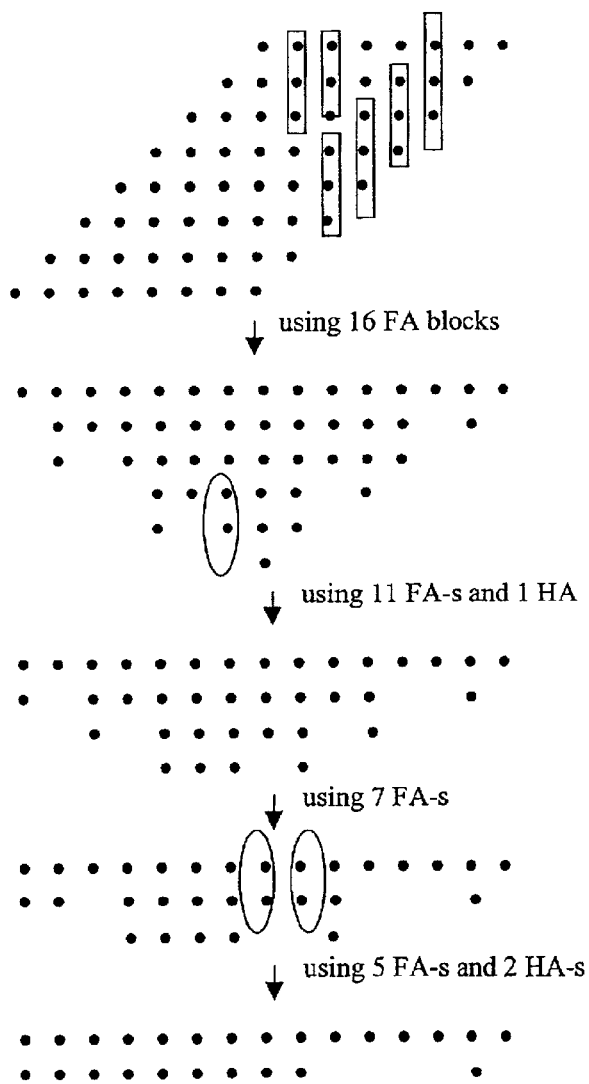
FIG. 30 is a schematic diagram of the process of FIG. 29 in more detail.

Dadda's multiplier uses the scheme in on FIG. 29. If inputs have 8 bits then 64 parallel AND gates generate an array shown in FIG. 30. The AND gate sign ∧ is omitted for clarity so that $A_i \wedge B_j$ becomes $A_i B_j$. The rest of FIG. 30 illustrates array reduction that involves full adders (FA) and half adders (HA). Bits from the same column are added by half adders or full adders. Some groups of bits fed into a full adder are in rectangles. Some groups of bits fed into a half adder are in ovals. The result of array reduction is just two binary numbers to be added at the last step. One adds these two numbers by one of fast addition schemes, for instance, conditional adder or carry-look-ahead adder.

This aspect of the present invention comprises two preferred steps: array deformation and array reduction using the parallel counter in accordance with the first aspect of the present invention.

The process of array deformation will now be described.

Figure 31:
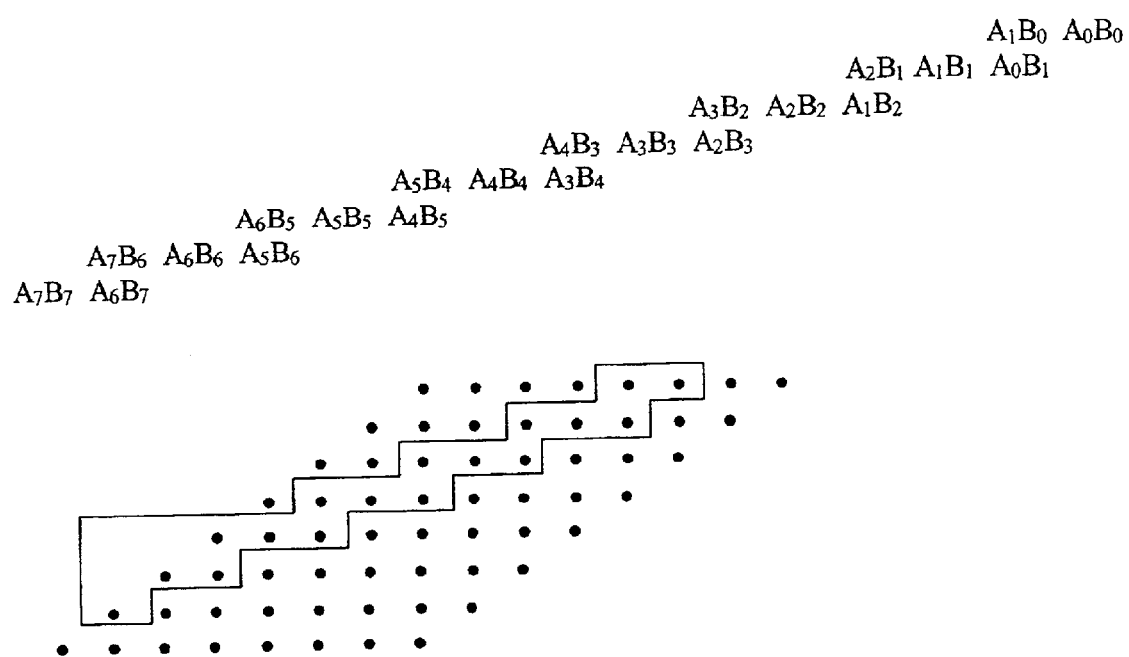
FIG. 31 is a diagram illustrating the properties of diagonal regions in the array.

Some parts of the multiplication array, formed by $A_i B_j$ such as on FIG. 30, have interesting properties. One can write simple formulas for the sum of the bits in these parts. Examples of such special parts are on FIG. 31. In general, chose an integer k, and those $A_i B_j$ in the array such that the absolute value of i−j−k is less or equal to 1 comprise a special part.

Figure 1:
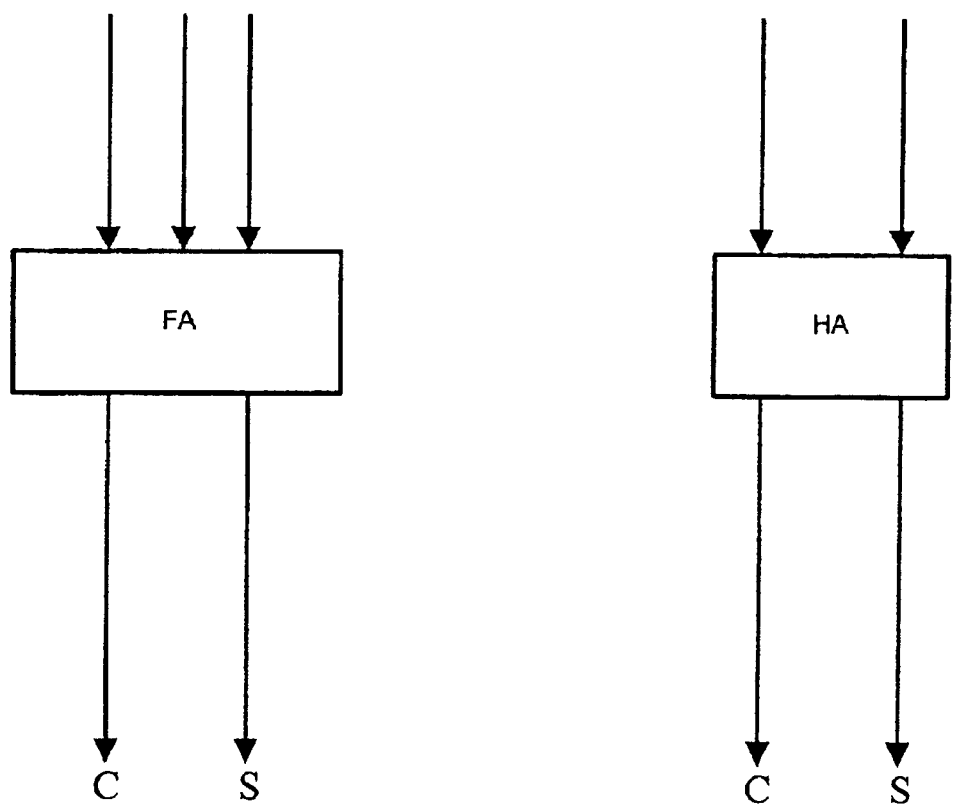
FIG. 1 is a schematic diagram of a full adder and a half adder in accordance with the prior art.

Let $S_i$ be the bits of the sum of all the bits of the form $A_i B_j$ shown on FIG. 1. Then $$S_0 = A_0 \wedge B_0,$$

$$S_1 = (A_1 \wedge B_0) \oplus (A_0 \wedge B_1),$$

$$S_2 = (A_1 \wedge B_1) \oplus (A_1 \wedge B_1 \wedge A_0 \wedge B_0),$$

$$S_{2k+1} = (A_{k+1} \wedge B_k) \oplus (A_k \wedge B_{k+1}) \oplus (A_k \wedge B_k \wedge A_{k-1} \wedge B_{k-1})$$

for all k>0, $$S_{2k} = (A_k \wedge B_k) \oplus (A_{k-1} \wedge B_{k-1} \wedge ((A_{k+1} \wedge B_{k+1}) \vee (A_{k-1} \wedge B_{k-1} \wedge (A_{k+1} \vee B_{k+1}))))$$

for all k>1.

These formulas show that the logic for summing the chosen entries in the array does not get large. Whereas if random numbers were summed the logic for the $(n+1)^{th}$ bit is larger than the logic for the $n^{th}$ bit.

Using these formulas, one can generate a different array. The shape of array changes. This is why it is called array deformation. These formulas are important because one can speed up a multiplication circuit by generating an array of a particular shape.

The array in FIG. 32 is for an 8-bit multiplication. The AND gate sign ∧ is omitted for clarity so that $A_i \wedge B_j$ becomes $A_i B_j$. Array deformation logic generates X, Y, and Z:

$$X = (A_1 \wedge B_6) \oplus (A_0 \wedge B_7),$$

$$Y = A_1 \wedge B_7 \wedge \neg(A_0 \wedge B_6),$$

$$Z = A_1 \wedge B_7 \wedge A_0 \wedge B_6.$$

Figure 2:
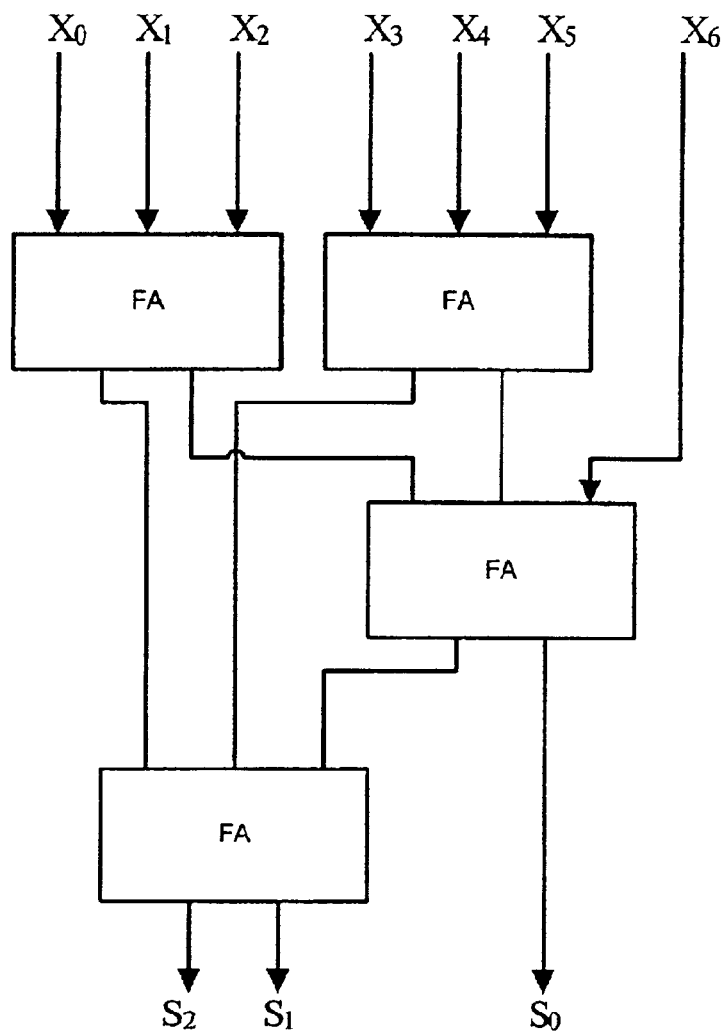
FIG. 2 is a schematic diagram of a parallel counter using full adders in accordance with the prior art.
Figure 33:
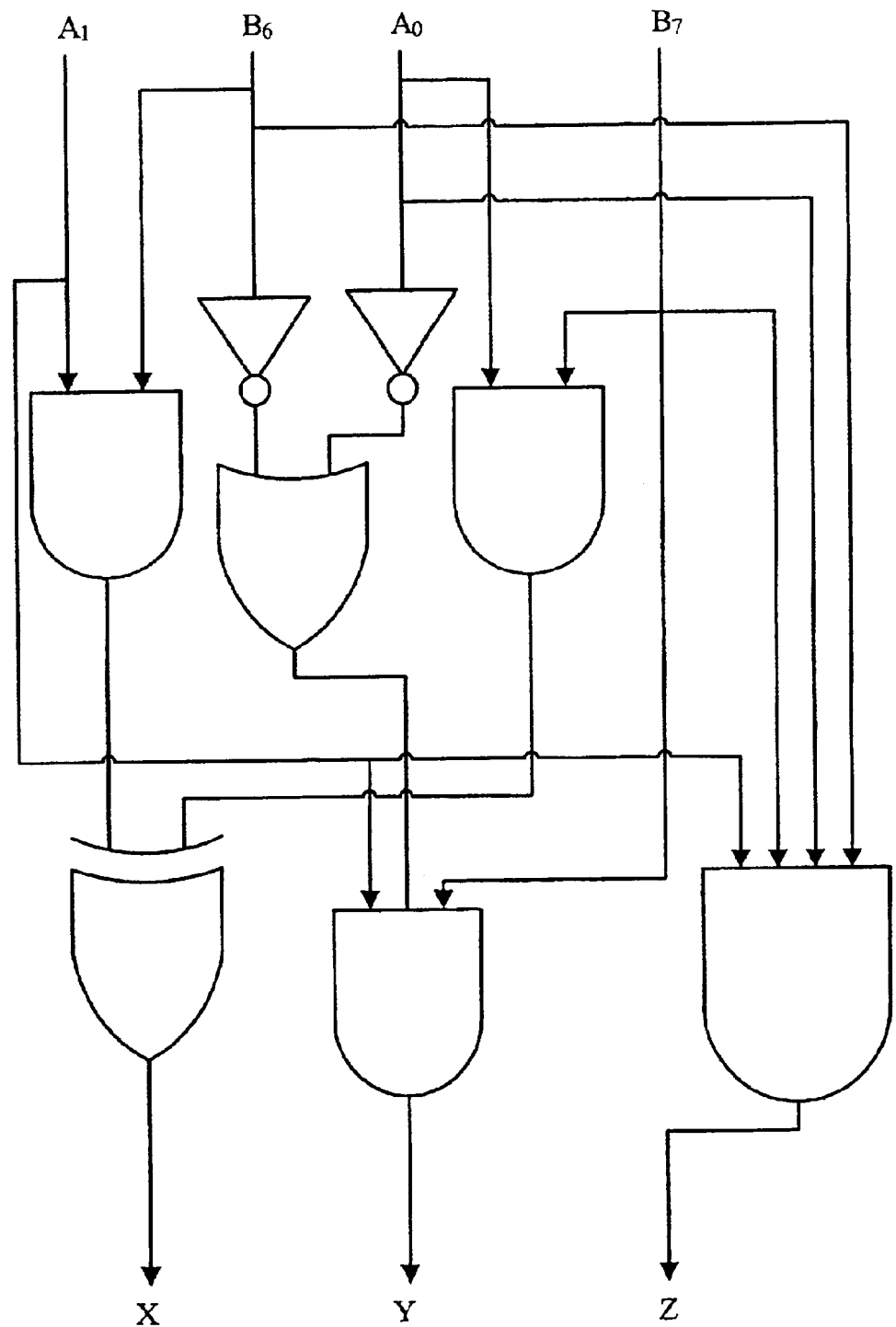
FIG. 33 is a diagram of logic used in this embodiment for array generation.

The advantage of this array over one in FIG. 30 is that the maximal number of bits in a column is smaller. The array in FIG. 30 has a column with 8 bits. The array on FIG. 32 has 4 columns with 7 bits but none with 8 or more bits. The logic for the generation of X Y and Z is illustrated in FIG. 33. This logic can be used in parallel with the first two fall adders (illustrated in FIG. 2) in the array reduction step thus avoiding delays caused by additional logic.

Array reduction is illustrated in FIG. 32. The first step utilizes 1 half adder, 3 full adders, 1 parallel counter with 4 inputs, 2 parallel counters with 5 inputs, 1 parallel counter with 6 inputs, and 4 parallel counters with 7 inputs. The three parallel counters (in columns 7, 8, and 9) have an implementation based on 7=5+2 partition. The bits X, Y, and Z join the group of two in the partition. The counter in column 6 is implemented on 7=4+3 partition. The counter in column 5 is based on 6=3+3 partition. The remaining counters should not be partitioned. The locations of full adders are indicated by ovals. The half adder is shown by a rectangle.

An adder for adding the final two binary numbers is designed based on arrival time of bits in two numbers. This gives a slight advantage but it is based on common knowledge, that is conditional adder and ripple-carry adder.

Although in this embodiment the addition of two 8 bit numbers has been illustrated, the invention is applicable to any N bit binary number addition. For example for 16 bit addition, the array reduction will reduce the middle column height from 16 to 15 thus allowing two seven bit fall adders to be used for the first layer to generate two 3 bit outputs and the left over input can be used with the other two 3 outputs as an input to a further seven input full adder thus allowing the addition of the 16 bits in only two layers.

Although this embodiment of the present invention has been described with reference to the formation of the array by logical AND binary combination, this aspect of the present invention encompasses any method of forming the array including any method of logically combining bits of two binary numbers e.g. OR combining, EXOR combining and NAND combining and forming the array using Booth encoding. Further, the length of the two binary numbers need not be the same.

Although this aspect of present invention has been described with reference to a specific multiplication logic circuit, the present invention also applies to any logic circuit that performs multiplication including a multiply-accumulate logic circuit (which can be viewed as a special case of a multiplication logic circuit). In a multiply-accumulate logic circuit the operation A×B+C is implemented where C is the accumulation of previous multiplications. The multiply-accumulate logic circuit operates by generating the array of A×B as described hereinabove for the multiplication logic circuit. An additional row is added in the array for the bits of C. C can have many more bits than A or B due to previous accumulations. This enlarged array then undergoes array reduction as described hereinabove.

This aspect of the present invention can be used with the parallel counter of the first aspects of the present invention to provide a fast circuit.

The parallel counter of the first aspects of the present invention has other applications, other than used in the multiplier of one aspect of the present invention. It can be used in RSA and reduced area multipliers. Sometimes, it is practical to build just a fragment of the multiplier. This can happen when the array is too large, for instance in RSA algorithms where multiplicands may have more than more than 1000 bits. This fragment of a multiplier is then used repeatedly to reduce the array. In current implementations, it consists of a collection of full adders. One can use 7 input parallel counters followed by full adders instead.

A parallel counter can also be used in circuits for error correction codes. One can use a parallel counter to produce Hamming distance. This distance is useful in digital communication. In particular the Hamming distance has to be computed in certain types of decoders, for instance, the Viterbi decoder or majority-logic decoder.

Given two binary messages $(A_1, A_2, \ldots A_n)$ and $(B_1, B_2, \ldots B_n)$, the Hamming distance between them is the number of indices i between 1 and n such that $A_i$ and $B_i$ are different. This distance can be computed by a parallel counter whose n inputs are $$(A_1 \oplus B_1, A_2 \oplus B_2, \ldots A_n \oplus B_n).$$

The multiply-and-add operation is fundamental in digital electronics because it includes filtering. Given 2n binary numbers $X_1, X_2, \ldots X_n, Y_1, Y_2, \ldots Y_n$, the result of this operation is $$X_1Y_1 + X_2Y_2 + \ldots + X_nY_n.$$

One can use the multiplier described to implement multiply-and-add in hardware. Another strategy can be to use the scheme in FIG. 29. All partial products in products $X_iY_i$ generate an array. Then one uses the parallel counter X to reduce the array.

In the present invention, one can use the parallel counter whenever there is a need to add an array of numbers. For instance, multiplying negative number in two-complement form, one generates a different array by either Booth recording (A. D. Booth, *A Signed Binary Multiplication Technique*, Q. J. Mech. Appl. Math. 4: 236–240 (1951)) (the content of which is hereby incorporated by reference) or another method. To obtain a product one adds this array of numbers.

Figure 34:
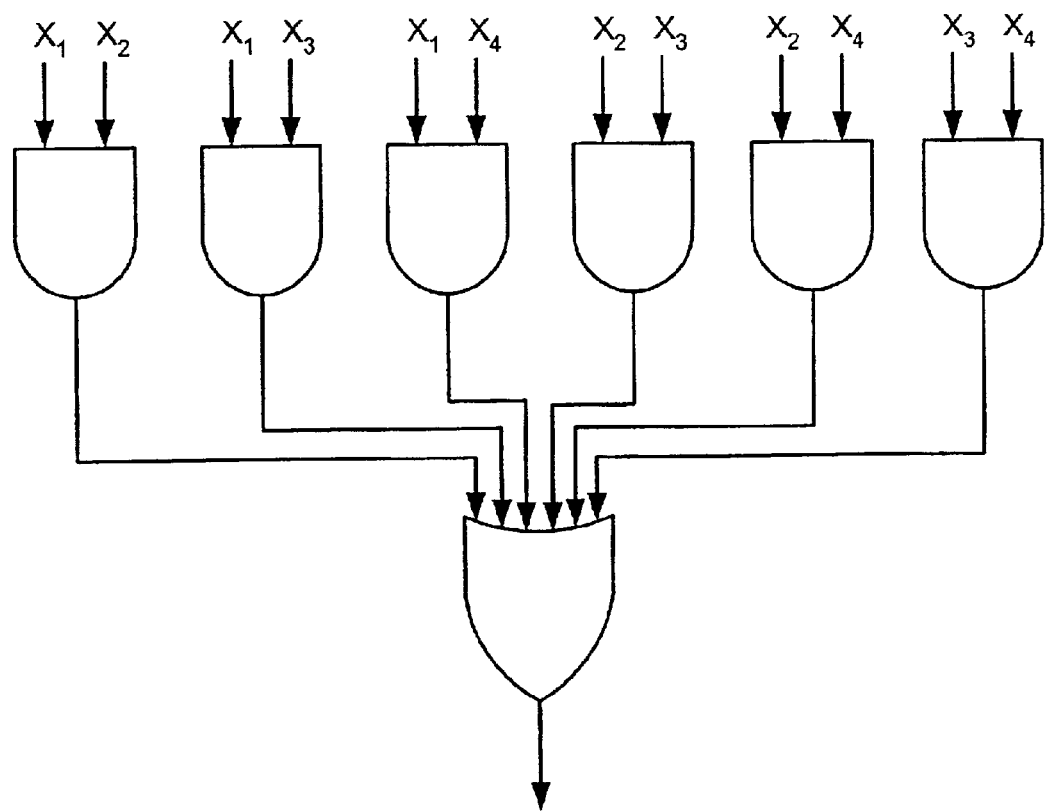
FIG. 34 is a diagram of a logic circuit for generating an output as a threshold function.

FIG. 34 illustrates an embodiment of another aspect of the present invention. This embodiment generates an output in accordance with a threshold function having a threshold of 2 and implemented as a binary tree. The circuit thus implements an elementary symmetric function for the generation of the output when the number of input that are high (k) is at least 2.

The output is thus generated as the OR symmetric function:

$$OR\_4\_2 = X_1 \wedge X_2 \vee X_1 \wedge X_3 \vee X_1 \wedge X_4 \vee X_2 \wedge X_3 \vee X_2 \wedge X_4 \vee X_3 \wedge X_4$$

The circuit can thus act as a switch to provide an output when a certain number of inputs are high. The output can comprise any elementary symmetric function e.g. OR\_n\_k where n is the number of inputs and k is the number of high inputs.

Although in this embodiment only one output is shown, the principles of this aspect of the present invention can be used to generate more than one output each being OR\_n\_k. For example, one output could be OR\_4\_2 and another OR\_4\_3. Thus the present invention encompasses logic circuits that provide outputs using threshold functions. This can be used for parallel counter outputs or for other logic circuits.

Although the present invention has been described hereinabove with reference t specific embodiments, it will be apparent to a skilled person in the art that modifications lie within the spirit and scope of the present invention.

The logic circuits of the embodiments of the present invention described hereinabove can be implemented in an integrated circuit, or in any digital electronic device.

What is claimed is:

1. A parallel counter comprising:

a plurality of inputs for receiving a binary number as a plurality of binary inputs;

a plurality of outputs for outputting binary code indicating the number of binary ones in the plurality of binary inputs; and a logic circuit connected between the plurality of inputs and the plurality of binary outputs and for generating each of the plurality of binary outputs as an elementary symmetric function of the binary inputs, wherein said logic circuit is arranged to generate a first binary output as an elementary symmetric function of the binary inputs using exclusive OR logic for combining a plurality of sets of one or more binary inputs, and to generate an $N^{th}$ binary output as an elementary symmetric function of the binary inputs using OR logic for combining a plurality of sets of one or more binary inputs.

2. A parallel counter comprising:

a plurality of inputs for receiving a binary number as a plurality of binary inputs;

a plurality of outputs for outputting binary code indicating the number of binary ones in the plurality of binary inputs; and a logic circuit connected between the plurality of inputs and the plurality of binary outputs and for generating each of the plurality of binary outputs as an elementary symmetric function of the binary inputs, wherein said logic circuit is arranged to generate two possible binary outputs for a binary output less significant than the $N^{th}$ binary output, as elementary symmetric functions of the binary inputs using OR logic for combining a plurality of sets of one or more binary inputs where N is the number of binary outputs, the sets used for each possible binary output being of two different sizes which are a function of the binary output being generated; and said logic circuit include selector logic to select one of the possible binary outputs based on a more significant binary output value.

3. A parallel counter according to claim 2, wherein said logic circuit is arranged to generate the two possible binary outputs for the $(N-1)^{th}$ binary output less significant than the $N^{th}$ binary output, as elementary symmetric functions of the binary inputs using OR logic for combining a plurality of sets of one or more binary inputs, the sets used for each possible binary output being of size $2^{N-1} + 2^{N-2}$ and $2^{N-2}$ respectively and said selector logic being arranged to select one of the possible binary outputs based on the $N^{th}$ binary output value.

4. A parallel counter comprising:
a plurality of inputs for receiving a binary number as a plurality of binary inputs;
a plurality of outputs for outputting binary code indicating the number of binary ones in the plurality of binary inputs; and
a logic circuit connected between the plurality of inputs and the plurality of binary outputs and for generating each of the plurality of binary outputs as an elementary symmetric function of the binary inputs, wherein said logic circuit is arranged to generate two possible binary outputs for a binary output less significant than the $N^{th}$ binary output, as elementary symmetric functions of the binary inputs; and said logic circuit includes selector logic to select one of the possible binary outputs based on a more significant binary output value.

5. A parallel counter comprising:
a plurality of inputs for receiving a binary number as a plurality of binary inputs;
a plurality of outputs for outputting binary code indicating the number of binary ones in the plurality of binary inputs; and
a logic circuit connected between the plurality of inputs and the plurality of binary outputs and for generating each of the plurality of binary outputs as an elementary symmetric function of the binary inputs, wherein said logic circuit includes logic units for generating intermediate outputs as elementary symmetric functions of the binary inputs and is arranged to generate a binary output less significant than the $N^{th}$ binary output by combining intermediate outputs of the logic units by AND combining at least the intermediate output of one logic unit and an inverted output of another logic unit and OR combining the result of the AND combining with another intermediate output.

6. A parallel counter according to claim 5, wherein said logic circuit is arranged to generate the $k^{th}$ binary output $S_k$, where k=0 to t−1 and t is the number of outputs in accordance with the relationship:

$$S_k = \{OR\_n\_2^k \wedge \neg OR\_n\_2^{k+1}\} \vee \{OR\_n\_2^{k+1} + 2^k \wedge \neg OR\_n\_2^{k+2}\}$$
$$\vee \{OR\_n\_2^{k+2}+2^k \wedge \neg OR\_n\_2^{k+2}+2^{k+1}\} \vee OR\_n\_2^t+2^{t-1}+2^{t-2}+2^k$$

where $\wedge$ is the logical AND operation, $\vee$ is the logical OR operation, and $\neg$ is an inversion operation.

7. A parallel counter comprising:
a plurality of inputs for receiving a binary number as a plurality of binary inputs;
a plurality of outputs for outputting binary code indicating the number of binary ones in the plurality of binary inputs; and
a logic circuit connected between the plurality of inputs and the plurality of binary outputs and for generating each of the plurality of binary outputs as an elementary symmetric function of the binary inputs, wherein said logic circuit includes a plurality of subcircuit logic modules each generating intermediate binary outputs as an elementary symmetric function of some of the binary inputs, and logic for logically combining the intermediate binary outputs to generate said binary outputs.

8. A parallel counter according to claim 7, wherein said subcircuit logic modules are arranged to use OR logic for combining sets of said some of said binary inputs.

9. A parallel counter according to claim 8, wherein said logic circuit includes one or more logic modules each for generating a binary output as an elementary symmetric function of the binary inputs using executive OR logic for combining a plurality of sets of one or more binary inputs.

10. A parallel counter comprising:
a plurality of inputs for receiving a binary number as a plurality of binary inputs;
a plurality of outputs for outputting binary code indicating the number of binary ones in the plurality of binary inputs; and
a logic circuit connected between the plurality of inputs and the plurality of binary outputs and for generating each of the plurality of binary outputs as an elementary symmetric function of the binary inputs, wherein said logic circuit implements a large elementary symmetric function by implementing a plurality of small elementary symmetric functions and combining the results.

11. A parallel counter comprising:
a plurality of inputs for receiving a binary number as a plurality of binary inputs;
a plurality of outputs for outputting binary code indicating the number of binary ones in the plurality of binary inputs; and
a logic circuit connected between the plurality of inputs and the plurality of binary outputs and for generating each of the plurality of binary outputs as an elementary symmetric function of the binary inputs, wherein said logic circuit is divided into a plurality of logic units, each logic unit is arranged to generate logic unit binary outputs as an elementary symmetric function of the binary inputs to the logic unit, the binary inputs of said plurality of inputs are divided into inputs into a plurality of said logic units, and the binary outputs of said plurality of outputs are generated using binary outputs of a plurality of said logic units.

12. A parallel counter according to claim 11, wherein the logic units are arranged hierarchically such that logic units at a higher level in the hierarchy include the logic of at least one logic unit at a lower level in the hierarchy and have more of the binary inputs as inputs than the logic units at a lower level in the hierarchy.

13. A parallel counter according to claim 11, wherein the binary inputs of said plurality of inputs are divided according to a binary tree into inputs into a plurality of said logic units.

14. A parallel counter according to claim 13, wherein said logic units are arranged to receive $2^n$ of said binary inputs, where n is an integer indicating the level of the logic units in the binary tree, said logic circuit has m logic units at each level, where m is a rounded up integer determined from (the number of binary inputs)/$2^n$, logic units having a higher level in the binary tree comprise logic of logic units at lower levels in the binary tree, and each logic unit is arranged to generate logic unit binary outputs as a symmetric function of the binary inputs to the logic unit.

15. A parallel counter according to claim 14, wherein each logic unit at the first level is arranged to generate logic unit binary outputs as a small elementary symmetric function of the binary inputs to said logic circuit.

16. A parallel counter according to claim 15, wherein each logic unit at the first level is arranged to generate logic unit binary outputs as an elementary symmetric function of the binary inputs to said logic circuit using exclusive OR logic for combining the binary inputs.

17. A parallel counter according to claim 16, wherein each logic unit at the first level is arranged to logically AND each of the binary inputs to the logic unit and to logically exclusively OR each of the binary inputs to the logic unit to generate the logic unit binary outputs.

18. A parallel counter according to claim 14, wherein each logic unit at the first level is arranged to generate logic unit binary outputs as an elementary symmetric function of the binary inputs to said logic circuit using OR logic for combining the binary inputs.

19. A parallel counter according to claim 18, wherein each logic unit at the first level is arranged to logically AND each of the binary inputs to the logic unit and to logically OR each of the binary inputs to the logic unit to generate the logic unit binary outputs.

20. A parallel counter according to claim 14, wherein elementary logic units are provided as the logic units at the first level for performing elementary symmetric functions, outputs from each of two primary elementary logic units receiving four logically adjacent binary inputs from said plurality of inputs are input to two secondary elementary logic units, an output from each of the secondary elementary logic units is input to a tertiary elementary logic unit, and said primary, secondary and tertiary elementary logic units form a secondary logic unit at a second level of the binary tree having a binary output comprising a binary output from each of said secondary elementary logic units and two binary outputs from said tertiary elementary logic unit.

21. A parallel counter according to claim 20, wherein tertiary logic units at a third level of the binary tree each comprise two secondary logic units receiving eight logically adjacent binary inputs from said plurality of inputs, four elementary logic units receiving as inputs the outputs of said two secondary logic units, and further logic for generating binary outputs as a symmetric function of the binary inputs to said tertiary logic unit using the binary outputs of said four elementary logic units.

22. A parallel counter according to claim 21, wherein quaternary logic units at a fourth level of the binary tree each comprise two tertiary logic units receiving sixteen logically adjacent binary inputs from said plurality of inputs, four elementary logic units receiving as inputs the outputs of said two tertiary logic units, and further logic for generating binary outputs as a symmetric function of the binary inputs to said quaternary logic unit using the binary outputs of said four elementary logic units.

23. A parallel counter according to claim 14, wherein elementary logic units are provided as the logic units at the first level for performing elementary symmetric functions, and logic units for higher levels are comprised of logic units of lower levels.

24. A parallel counter according to claim 23, wherein said logic units for higher levels above the second level comprise logic units of an immediately preceding level and elementary logic units.

25. A parallel counter according to claim 14, wherein each logic unit at each level is arranged to generate logic unit binary outputs as an elementary symmetric function of the binary inputs to said logic circuit using OR logic for combining the binary inputs.

26. A parallel counter according to claim 14, wherein each logic unit at each level is arranged to generate logic unit binary outputs as an elementary symmetric function of the binary inputs to said logic circuit using exclusive OR logic for combining the binary inputs.

27. A parallel counter according to claim 11, wherein the logic units are arranged hierarchically and at least one logic unit in at least one level of the hierarchy implements an inverted elementary symmetric function.

28. A parallel counter according to claim 27, wherein logic units at an odd number of levels in the hierarchy implement inverted elementary symmetric functions, logic units at an even number of levels in the hierarchy implement symmetric functions, and the inputs to the logic units at the first level of the hierarchy are inverted.

29. A parallel counter according to claim 27, wherein logic units at an even number of levels in the hierarchy implement inverted elementary symmetric functions, logic units at an even number of levels in the hierarchy implement symmetric functions, and the inputs to the logic units at the first level of the hierarchy are input to logic units in a first level in the hierarchy uninverted.

30. A parallel counter according to claim 27, wherein logic units at an even number of levels in the hierarchy implement inverted elementary symmetric functions, logic units at an odd number of levels in the hierarchy implement symmetric functions, and the inputs to the logic units at the first level of the hierarchy are inverted.

31. A parallel counter according to claim 27, wherein at least one logic unit in at least one level of the hierarchy implements an elementary symmetric function and the or each inverted elementary symmetric function and the or each elementary symmetric function are implemented in alternated levels in the hierarchy.

32. A parallel counter according to claim 27, wherein logic units in at least one level in the hierarchy comprise inversion logic.

33. A parallel counter according to claim 27, wherein the logic units are arranged hierarchically in a binary tree structure.

34. A parallel counter comprising:
a plurality of inputs for receiving a binary number as a plurality of binary inputs;
a plurality of outputs for outputting binary code indicating the number of binary ones in the plurality of binary inputs; and
a logic circuit connected between the plurality of inputs and the plurality of binary outputs and for generating each of the plurality of binary outputs as an elementary symmetric function of the binary inputs, wherein the number of inputs is at least four and the number of outputs is at least three.

35. A parallel counter according to claim 34, wherein said logic circuit is arranged to generate at least two outputs independently of each other.

36. A parallel counter according to claim 34, wherein said logic circuit is arranged to generate at least one of the binary outputs as an elementary symmetric function of the binary inputs using OR logic for combining a plurality of sets of one or more binary inputs.

37. A parallel counter according to claim 36, wherein said logic circuit is arranged to logically AND members of each set of binary inputs and to logically OR the result of the AND operations.

38. A parallel counter according to claim 37, wherein said logic circuit is arranged to logically AND $2^i$ of the binary inputs in each set for the generation of the $i^{th}$ binary output, where i is the integer from 1 to N, N is the number of binary outputs and the i represents the significance of each binary output, each set being unique and the sets covering all possible combinations of binary inputs.

39. A parallel counter according to claim 37, wherein said logic circuit is arranged to logically AND members of each set of binary inputs, where each set is unique and the sets cover all possible combinations of binary inputs.

40. A parallel counter according to claim 34, wherein said logic circuit is arranged to generate at least one of the binary outputs as an elementary symmetric function of the binary inputs using OR logic for combining a plurality of sets of one or more binary inputs.

41. A parallel counter according to claim 40, wherein said logic circuit is arranged to logically AND members of each set of binary inputs and to logically OR the result of the AND operations.

42. A parallel counter according to claim 41, wherein said logic circuit is arranged to logically AND $2^{N-1}$ of the binary inputs in each set for the generation of the $N^{th}$ binary output, where N is the number of binary outputs and the $N^{th}$ binary output is the most significant, each set being unique and the sets covering all possible combinations of binary inputs.

43. A parallel counter according to claim 42, wherein said logic circuit is arranged to logically AND members of each set of binary inputs, where each set is unique and the sets cover all possible combinations of binary inputs.

44. A parallel counter comprising:
at least five inputs for receiving a binary number as a plurality of binary inputs;
at least three outputs for outputting binary code indicating the number of binary ones in the plurality of binary inputs; and
a logic circuit connected between the plurality of inputs and the plurality of binary outputs and for generating each of the plurality of binary outputs as an elementary symmetric function of the binary inputs.

45. A parallel counter according to claim 44, wherein said logic circuit is arranged to generate at least two outputs independently of each other.

46. A parallel counter comprising:
n inputs for receiving a binary number as binary inputs, where $4 \geq n \geq 7$;
three outputs for outputting binary code indicating the number of binary ones in the binary inputs; and
a logic circuit connected between the inputs and the three outputs and for generating a first output as an elementary symmetric function EXOR_n_1 of the binary inputs, a second output as a combination of three elementary symmetric functions OR_n_2, OR_n_4 and OR_n_6, and a third output as an elementary symmetric function OR_n_4.

47. A parallel counter comprising:
n inputs for receiving a binary number as binary inputs, where $8 \geq n \geq 15$;
four outputs for outputting binary code indicating the number of binary ones in the binary inputs; and
a logic circuit connected between the inputs and the four outputs and for generating a first output as an elementary symmetric function EXOR_n_1 of the binary inputs, a second output as an elementary symmetric function EXOR_n_2 of the binary inputs, a third output as a combination of three elementary symmetric functions OR_n_4, OR_n_8 and OR_n_12, and a third output as an elementary symmetric function OR_n_8.

48. A logic circuit comprising:
at least four inputs for receiving a binary number as a plurality of binary inputs;
at least one output for outputting binary code;
logic elements connected between the plurality of inputs and the or each binary output and for generating the or each binary output in accordance with a threshold function implemented as a binary tree and having a threshold of at least 2;
wherein the logic elements are arranged to generate the or each binary output as an elementary symmetric function of the binary inputs;
wherein the logic elements are arranged to generate at least one of the binary outputs as an OR symmetric function of the binary inputs; and
wherein the logic elements are arranged to generate at least one of the binary outputs as an exclusive OR symmetric function of the binary inputs.

49. A logic circuit, comprising:
at least four inputs for receiving a binary number as a plurality of binary inputs;
at least one output for outputting binary code;
logic elements connected between the plurality of inputs and the or each binary output and for generating the or each binary output in accordance with a threshold function implemented as a binary tree and having a threshold of at least 2; and
wherein said logic elements comprise a plurality of sub-circuit logic modules each generating intermediate binary outputs as an elementary symmetric function of some of the binary inputs, and logic for logically combining the intermediate binary outputs to generate the or each binary output.

50. A logic circuit comprising:
at least four inputs for receiving a binary number as a plurality of binary inputs;
at least one output for outputting binary code;
logic elements connected between the plurality of inputs and the or each binary output and for generating the or each binary output in accordance with a threshold function implemented as a binary tree and having a threshold of at least 2;
wherein the logic elements are arranged to generate the or each binary output as an elementary symmetric function of the binary inputs; and
wherein said logic elements comprise a plurality of logic modules each for generating intermediate binary outputs as an elementary symmetric function of some of the binary inputs, and logic for logically combining the intermediate binary outputs to generate the or each binary output, and the logic modules are arranged hierarchically and at least one logic module in at least one level of the hierarchy implements an inverted elementary symmetric function.

51. A logic circuit according to claim 50, wherein logic modules at an odd number of levels in the hierarchy implement inverted elementary symmetric functions, logic modules at an even number of levels in the hierarchy implement symmetric functions, and the inputs to the logic modules at the first level of the hierarchy are inverted.

52. A logic circuit according to claim 50, wherein logic modules at an even number of levels in the hierarchy implement inverted elementary symmetric functions, logic modules at an even number of levels in the hierarchy implement symmetric functions, and the inputs to the logic modules at the first level of the hierarchy are input to logic units in a first level in the hierarchy uninverted.

53. A logic circuit according to claim 50, wherein logic modules at an even number of levels in the hierarchy implement inverted elementary symmetric functions, logic modules at an odd number of levels in the hierarchy implement symmetric functions, and the inputs to the logic modules at the first level of the hierarchy are inverted.

54. A logic circuit according to claim 50, wherein at least one logic module in at least one level of the hierarchy implements an elementary symmetric function, and the or each inverted elementary symmetric function and the or each elementary symmetric function are implemented in alternated levels in the hierarchy.

55. A logic circuit according to claim 50, wherein logic modules in at least one level in the hierarchy comprise inversion logic.

56. A logic circuit according to claim 50, wherein the logic modules are arranged hierarchically in a binary tree structure.

57. A logic circuit, comprising:
at least four inputs for receiving a binary number as a plurality of binary inputs;
at least one output for outputting binary code;
logic elements connected between the plurality of inputs and the plurality of binary outputs arranged to generate the or each of the plurality of binary outputs as an elementary symmetric function of the binary inputs; and
wherein said logic elements are arranged to generate at least one of the binary outputs as an elementary symmetric function of the binary inputs using exclusive OR logic for combining a plurality of sets of one or more binary inputs.

58. A logic circuit, comprising:
at least four inputs for receiving a binary number as a plurality of binary inputs;
at least one output for outputting binary code;
logic elements connected between the plurality of inputs and the plurality of binary outputs arranged to generate the or each of the plurality of binary outputs as an elementary symmetric function of the binary inputs; and
wherein said logic elements are arranged to generate a first binary output as an elementary symmetric function of the binary inputs using exclusive OR logic for combining a plurality of sets of one or more binary inputs, and to generate an $N^{th}$ binary output as an elementary symmetric function of the binary inputs using OR logic for combining a plurality of sets of one or more binary inputs.

59. A logic circuit, comprising:
at least four inputs for receiving a binary number as a plurality of binary inputs;
at least one output for outputting binary code;
logic elements connected between the plurality of inputs and the plurality of binary outputs arranged to generate the or each of the plurality of binary outputs as an elementary symmetric function of the binary inputs; and
wherein said logic elements are arranged to generate two possible binary outputs for a binary output less significant than the $N^{th}$ binary output, as elementary symmetric functions of the binary inputs using OR logic for combining a plurality of sets of one or more binary inputs where N is the number of binary outputs, the sets used for each possible binary output being of two different sizes which are a function of the binary output being generated; and said logic elements include selector logic to select one of the possible binary outputs based on a more significant binary output value.

60. A logic circuit according to claim 59, wherein said logic elements are arranged to generate the two possible binary outputs for the $(N-1)^{th}$ binary output less significant than the $N^{th}$ binary output, as elementary symmetric functions of the binary inputs using OR logic for combining a plurality of sets of one or more binary inputs, the sets used for each possible binary output being of size $2^{N-1}+2^{N-2}$ and $2^{N-2}$ respectively and said selector logic being arranged to select one of the possible binary outputs based on the $N^{th}$ binary output value.

61. A logic circuit, comprising:
at least four inputs for receiving a binary number as a plurality of binary inputs;
at least one output for outputting binary code;
logic elements connected between the plurality of inputs and the plurality of binary outputs arranged to generate the or each of the plurality of binary outputs as an elementary symmetric function of the binary inputs; and
wherein said logic elements are arranged to generate two possible binary outputs for a binary output less significant than the $N^{th}$ binary output, as elementary symmetric functions of the binary inputs; and said logic elements include selector logic to select one of the possible binary outputs based on a more significant binary output value.

62. A logic circuit, comprising:
at least four inputs for receiving a binary number as a plurality of binary inputs;
at least one output for outputting binary code;
logic elements connected between the plurality of inputs and the plurality of binary outputs arranged to generate the or each of the plurality of binary outputs as an elementary symmetric function of the binary inputs; and
wherein said logic elements include logic units for generating intermediate outputs as elementary symmetric functions of the binary inputs, and are arranged to generate a binary output less significant than the $N^{th}$ binary output by combining intermediate outputs of the logic units by AND combining at least the intermediate output of one logic unit and an inverted output of another logic unit and OR combining the result of the AND combining with another intermediate output.

63. A logic circuit according to claim 62, wherein said logic elements are arranged to generate the $k^{th}$ binary output $S_k$, where k=0 to t−1 and t is the number of outputs in accordance with the relationship:

$$S_k = \{OR\_n\_2^k \wedge \neg OR\_n\_2^{k+1}\} \vee \{OR\_n\_2^{k+1} + 2^k \wedge \neg OR\_n\_2^{k+2}\}$$

$$\vee \{OR\_n\_2^{k+2} + 2^k \wedge \neg OR\_n\_2^{k+2}+2^{k+1}\} \vee OR\_n\_2^t+2^{t-1}+2^{t-2}+2^k$$

where $\wedge$ is the logical AND operation, $\vee$ is the logical OR operation, and $\neg$ is an inversion operation.

64. A logic circuit, comprising:
at least four inputs for receiving a binary number as a plurality of binary inputs;
at least one output for outputting binary code;
logic elements connected between the plurality of inputs and the plurality of binary outputs arranged to generate the or each of the plurality of binary outputs as an elementary symmetric function of the binary inputs; and
wherein said logic elements include a plurality of subcircuit logic modules each generating intermediate binary outputs as an elementary symmetric function of some of the binary inputs, and logic for logically combining the intermediate binary outputs to generate said binary outputs.

65. A logic circuit according to claim 64, wherein said subcircuit logic modules are arranged to use OR logic for combining sets of said some of said binary inputs.

66. A logic circuit according to claim 65, wherein said logic elements include one or more logic modules each for generating a binary output as an elementary symmetric function of the binary inputs using executive OR logic for combining a plurality of sets of one or more binary inputs.

67. A logic circuit, comprising:
at least four inputs for receiving a binary number as a plurality of binary inputs;
at least one output for outputting binary code;
logic elements connected between the plurality of inputs and the plurality of binary outputs arranged to generate the or each of the plurality of binary outputs as an elementary symmetric function of the binary inputs; and
wherein said logic elements implement a large elementary symmetric function by implementing a plurality of small elementary symmetric functions and combining the results.

68. A logic circuit, comprising:
at least four inputs for receiving a binary number as a plurality of binary inputs;
at least one output for outputting binary code;
logic elements connected between the plurality of inputs and the plurality of binary outputs arranged to generate the or each of the plurality of binary outputs as an elementary symmetric function of the binary inputs; and
wherein said logic elements are divided into a plurality of logic units, each logic unit is arranged to generate logic unit binary outputs as an elementary symmetric function of the binary inputs to the logic unit, the binary inputs of said plurality of inputs are divided into inputs into a plurality of said logic units, and the binary outputs of said plurality of outputs are generated using binary outputs of a plurality of said logic units.

69. A logic circuit according to claim 68, wherein the logic units are arranged hierarchically such that logic units at a higher level in the hierarchy include the logic of at least one logic unit at a lower level in the hierarchy and have more of the binary inputs as inputs than the logic units at a lower level in the hierarchy.

70. A logic circuit according to claim 68, wherein the binary inputs of said plurality of inputs are divided according to a binary tree into inputs into a plurality of said logic units.

71. A logic circuit according to claim 70, wherein said logic units are arranged to receive $2^n$ of said binary inputs, where n is an integer indicating the level of the logic units in the binary tree, said logic circuit has m logic units at each level, where m is a rounded up integer determined from (the number of binary inputs)/$2^n$, logic units having a higher level in the binary tree comprise logic of logic units at lower levels in the binary tree, and each logic unit is arranged to generate logic unit binary outputs as a symmetric function of the binary inputs to the logic unit.

72. A logic circuit according to claim 71, wherein each logic unit at the first level is arranged to generate logic unit binary outputs as a small elementary symmetric function of the binary inputs to said logic circuit.

73. A logic circuit according to claim 72, wherein each logic unit at the first level is arranged to generate logic unit binary outputs as an elementary symmetric function of the binary inputs to said logic circuit using exclusive OR logic for combining the binary inputs.

74. A logic circuit according to claim 73, wherein each logic unit at the first level is arranged to logically AND each of the binary inputs to the logic unit and to logically exclusively OR each of the binary inputs to the logic unit to generate the logic unit binary outputs.

75. A logic circuit according to claim 71, wherein each logic unit at the first level is arranged to generate logic unit binary outputs as an elementary symmetric function of the binary inputs to said logic circuit using OR logic for combining the binary inputs.

76. A logic circuit according to claim 75, wherein each logic unit at the first level is arranged to logically AND each of the binary inputs to the logic unit and to logically OR each of the binary inputs to the logic unit to generate the logic unit binary outputs.

77. A logic circuit according claim 71, wherein elementary logic units are provided as the logic units at the first level for performing elementary symmetric functions, outputs from each of two primary elementary logic units receiving four logically adjacent binary inputs from said plurality of inputs are input to two secondary elementary logic units, an output from each of the secondary elementary logic units is input to a tertiary elementary logic unit, and said primary, secondary and tertiary elementary logic units form a secondary logic unit at a second level of the binary tree having a binary output comprising a binary output from each of said secondary elementary logic units and two binary outputs from said tertiary elementary logic unit.

78. A logic circuit according to claim 77, wherein tertiary logic units at a third level of the binary tree each comprise two secondary logic units receiving eight logically adjacent binary inputs from said plurality of inputs, four elementary logic units receiving as inputs the outputs of said two secondary logic units, and further logic for generating binary outputs as a symmetric function of the binary inputs to said tertiary logic unit using the binary outputs of said four elementary logic units.

79. A logic circuit according to claim 78, wherein quaternary logic units at a fourth level of the binary tree each comprise two tertiary logic units receiving sixteen logically adjacent binary inputs from said plurality of inputs, four elementary logic units receiving as inputs the outputs of said two tertiary logic units, and further logic for generating binary outputs as a symmetric function of the binary inputs to said quaternary logic unit using the binary outputs of said four elementary logic units.

80. A logic circuit according to claim 71, wherein elementary logic units are provided as the logic units at the first level for performing elementary symmetric functions, and logic units for higher levels are comprised of logic units of lower levels.

81. A logic circuit according to claim 79, wherein said logic units for higher levels above the second level comprise logic units of an immediately preceding level and elementary logic units.

82. A logic circuit according to claim 71, wherein each logic unit at each level is arranged to generate logic unit binary outputs as an elementary symmetric function of the binary inputs to said logic circuit using OR logic for combining the binary inputs.

83. A logic circuit according to claim 71, wherein each logic unit at each level is arranged to generate logic unit binary outputs as an elementary symmetric function of the binary inputs to said logic circuit using exclusive OR logic for combining the binary inputs.

84. A logic circuit according to claim 68, wherein the logic units are arranged hierarchically and at least one logic unit in at least one level of the hierarchy implements an inverted elementary symmetric function.

85. A logic circuit according to claim 84, wherein logic units at an odd number of levels in the hierarchy implement inverted elementary symmetric functions, logic units at an even number of levels in the hierarchy implement symmetric functions, and the inputs to the logic units at the first level of the hierarchy are inverted.

86. A logic circuit according to claim 84, wherein logic units at an even number of levels in the hierarchy implement inverted elementary symmetric functions, logic units at an even number of levels in the hierarchy implement symmetric functions, and the inputs to the logic units at the first level of the hierarchy are input to logic units in a first level in the hierarchy uninverted.

87. A logic circuit according to claim 84, wherein logic units at an even number of levels in the hierarchy implement inverted elementary symmetric functions, logic units at an odd number of levels in the hierarchy implement symmetric functions, and the inputs to the logic units at the first level of the hierarchy are inverted.

88. A logic circuit according to claim 84, wherein at least one logic unit in at least one level of the hierarchy implements an elementary symmetric function and the or each inverted elementary symmetric function and the or each elementary symmetric function are implemented in alternated levels in the hierarchy.

89. A logic circuit according to claim 84, wherein logic units in at least one level in the hierarchy comprise inversion logic.

90. A logic circuit according to claim 84, wherein the logic units are arranged hierarchically in a binary tree structure.

91. A computer system for designing a logic circuit comprising a plurality of inputs for receiving a binary number as a plurality of binary inputs, at least one output for outputting binary code, and logic elements connected between the plurality of inputs and the or each binary output and arranged to generate the or each binary output as a threshold function of the binary inputs, the method comprising:

determining logic elements for performing the threshold functions; and reducing the logic elements by identifying logic elements performing a logical AND of two threshold functions and reducing the identified logic elements to logic elements for performing the threshold function having the higher threshold, and identifying logic elements performing a logical OR of two threshold functions and reducing the identified logic elements to logic elements for performing the threshold function having the lower threshold.

92. A computer system according to claim 91, wherein the code stored in the memory comprises code for controlling the processor to: perform the reduction using logical OR threshold functions having the relationship:

$$OR\_n\_k \wedge OR\_n\_s = OR\_n\_k$$

$$OR\_n\_k \vee OR\_n\_s = OR\_n\_s$$

where $k \geq s$, n is the number of inputs and k and s are the number of high inputs.

93. A computer system according to claim 91, wherein the code stored in the memory comprises code for controlling the processor to: design the logic elements to perform the threshold functions as elementary symmetric functions, and to generate the or each binary output as an elementary symmetric function.

94. A computer system for designing a logic circuit comprising a plurality of inputs for receiving a binary number as a plurality of binary inputs, at least one output for outputting binary code, and logic elements connected between the plurality of inputs and the or each binary output and arranged to generate the or each binary output as a threshold function of the binary inputs, the system comprising:

a memory storing computer readable code;

a processor for reading and implementing the code;

wherein the code stored in the memory comprise code for controlling the processor to:

design the logic circuit using exclusive OR logic;

identify any logic which cannot have inputs that are high at the same time; and replace the identified exclusive OR logic with OR logic.

95. A computer system according to claim 94, wherein the code stored in the memory comprises code for controlling the processor to design the logic circuit to generate each binary as an elementary symmetric function of the binary inputs.

96. A computer system according to claim 94, wherein the code stored in the memory comprises code for controlling the processor to design the logic circuit as a parallel counter having a plurality of outputs.

97. A system for designing a logic circuit comprising:

storing means storing a library of logic module designs each for performing a small symmetric function;

designing means for designing a logic circuit to perform a large symmetric function; identifying small symmetric functions which can perform said symmetric function;

first selecting means for selecting logic modules from said library to perform said small symmetric functions;

identifying means for identifying a logic circuit in the selected logic circuit which performs a symmetric function and which can be used to perform another symmetric function; and second selecting means for selecting the logic circuit corresponding to the identified symmetric function and using the selected logic circuit with inverters to perform said other symmetric function using the relationship between the symmetric functions:

$$OR\_n\_k(X_1 \ldots X_n) = \neg OR\_n(n+1-k)(\neg X_1 \ldots \neg X_n)$$

where ¬ denotes an inversion, n is the number of inputs, and k is the number of sets of inputs AND combined together.

98. A computer system according to claim 97, wherein the symmetric functions are elementary symmetric functions.

99. A computer system for designing a logic circuit comprising:

a data memory storing a library of logic module designs each for performing a small symmetric function;

a code memory storing computer readable code;

a processor for reading and implementing the code;

wherein the code stored in the code memory comprises code for controlling the processor to:

design a logic circuit to perform a large symmetric function; identifying small symmetric functions which can perform said symmetric function;

select logic modules from said library to perform said small symmetric functions;

identify a logic circuit in the selected logic circuit which performs a symmetric function and which can be used to perform another symmetric function; and select the logic circuit corresponding to the identified symmetric function and using the selected logic circuit with inverters to perform said other symmetric function using the relationship between the symmetric functions:

$$OR\_n\_k(X_1 \ldots X_n) = \neg OR\_n(n+1-k)(\vee X_1 \ldots X_n)$$

where $\neg$ denotes an inversion, n is the number of inputs, and k is the number of sets of inputs AND combined together.

100. A system according to claim 99, wherein the symmetric functions are elementary symmetric functions.

* * * * *